United States Patent
Imamura

(10) Patent No.: US 9,648,189 B2
(45) Date of Patent: May 9, 2017

(54) IMAGE PROCESSING APPARATUS AND POWER CONTROL METHOD FOR IMAGE PROCESSING APPARATUS

(71) Applicant: CANON KABUSHIKI KAISHA, Tokyo (JP)

(72) Inventor: Takeru Imamura, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/094,037

(22) Filed: Dec. 2, 2013

(65) Prior Publication Data
US 2014/0153013 A1 Jun. 5, 2014

(30) Foreign Application Priority Data
Dec. 4, 2012 (JP) .................................. 2012-265256

(51) Int. Cl.
H04N 1/00 (2006.01)

(52) U.S. Cl.
CPC ..... *H04N 1/00896* (2013.01); *H04N 1/00037* (2013.01); *H04N 1/00082* (2013.01); *H04N 1/00689* (2013.01); *H04N 1/00697* (2013.01); *H04N 1/00771* (2013.01); *H04N 1/00631* (2013.01)

(58) Field of Classification Search
None
See application file for complete search history.

(56) References Cited

U.S. PATENT DOCUMENTS

| | | | | |
|---|---|---|---|---|
| 8,768,196 B2* | 7/2014 | Baba | ................. | G03G 15/5004 358/1.15 |
| 8,823,967 B2* | 9/2014 | Mamiya | ................ | G06F 1/3231 340/565 |
| 2009/0309904 A1* | 12/2009 | Shibasaki | .......... | H04N 1/00885 347/1 |
| 2010/0033751 A1* | 2/2010 | Kitamura | ............. | H04N 1/0049 358/1.14 |
| 2010/0150600 A1* | 6/2010 | Oyoshi | .............. | G03G 15/5004 399/88 |

(Continued)

FOREIGN PATENT DOCUMENTS

| | | |
|---|---|---|
| CN | 102480579 A | 5/2012 |
| JP | 2010-217303 A | 9/2010 |

(Continued)

*Primary Examiner* — Hilina K Demeter
(74) *Attorney, Agent, or Firm* — Canon U.S.A., Inc. IP Division

(57) ABSTRACT

An image processing apparatus comprises a first detecting unit configured to detect an object, a power control unit configured to shift the image processing apparatus from a second power state to a first power state which consumes more power than the second power state when the first detecting unit detects an object, and a second detecting unit configured to detect a sheet ejected to a sheet ejecting unit. The power control unit does not shift the image processing apparatus to the first power state when the second detecting unit no longer detects the sheet before a lapse of a predetermined period of time after the first detecting unit detects an object. The power control unit shifts the image processing apparatus to the first power state when the second detecting unit detects the sheet before a lapse of the predetermined period of time after the first detecting unit detects an object.

14 Claims, 24 Drawing Sheets

(56) References Cited

U.S. PATENT DOCUMENTS

| | | | | |
|---|---|---|---|---|
| 2010/0231390 A1* | 9/2010 | Hashimoto | ........ | G03G 15/5004 340/573.1 |
| 2011/0286052 A1* | 11/2011 | Takabatake | ........ | H04N 1/00395 358/475 |
| 2012/0328319 A1* | 12/2012 | Ogata | ................ | G03G 15/5016 399/75 |
| 2014/0153005 A1* | 6/2014 | Hayamizu | .......... | H04N 1/00488 358/1.5 |

FOREIGN PATENT DOCUMENTS

| JP | 2012058645 A | 3/2012 |
|---|---|---|
| JP | 5083447 B1 | 11/2012 |

\* cited by examiner

100

100

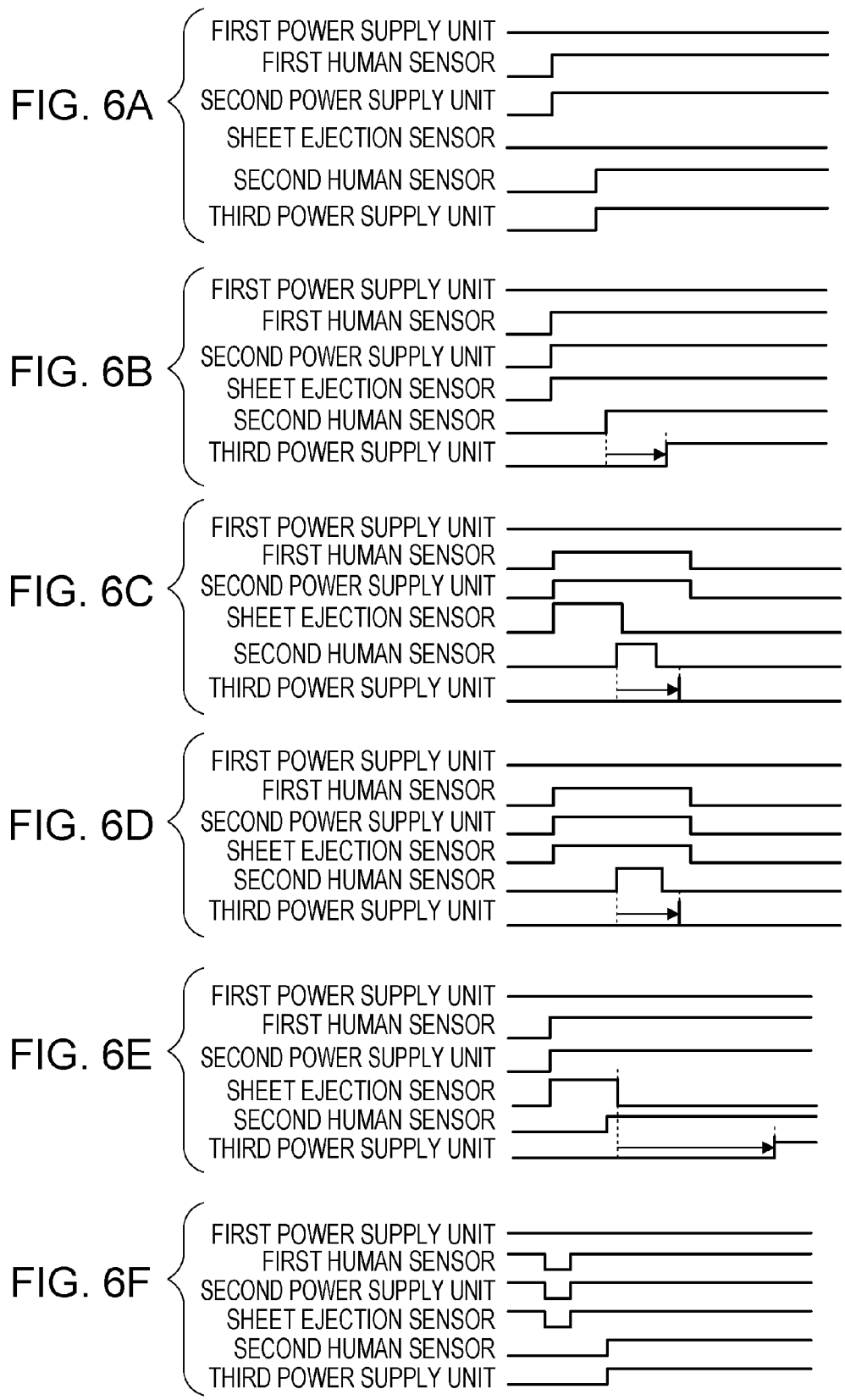

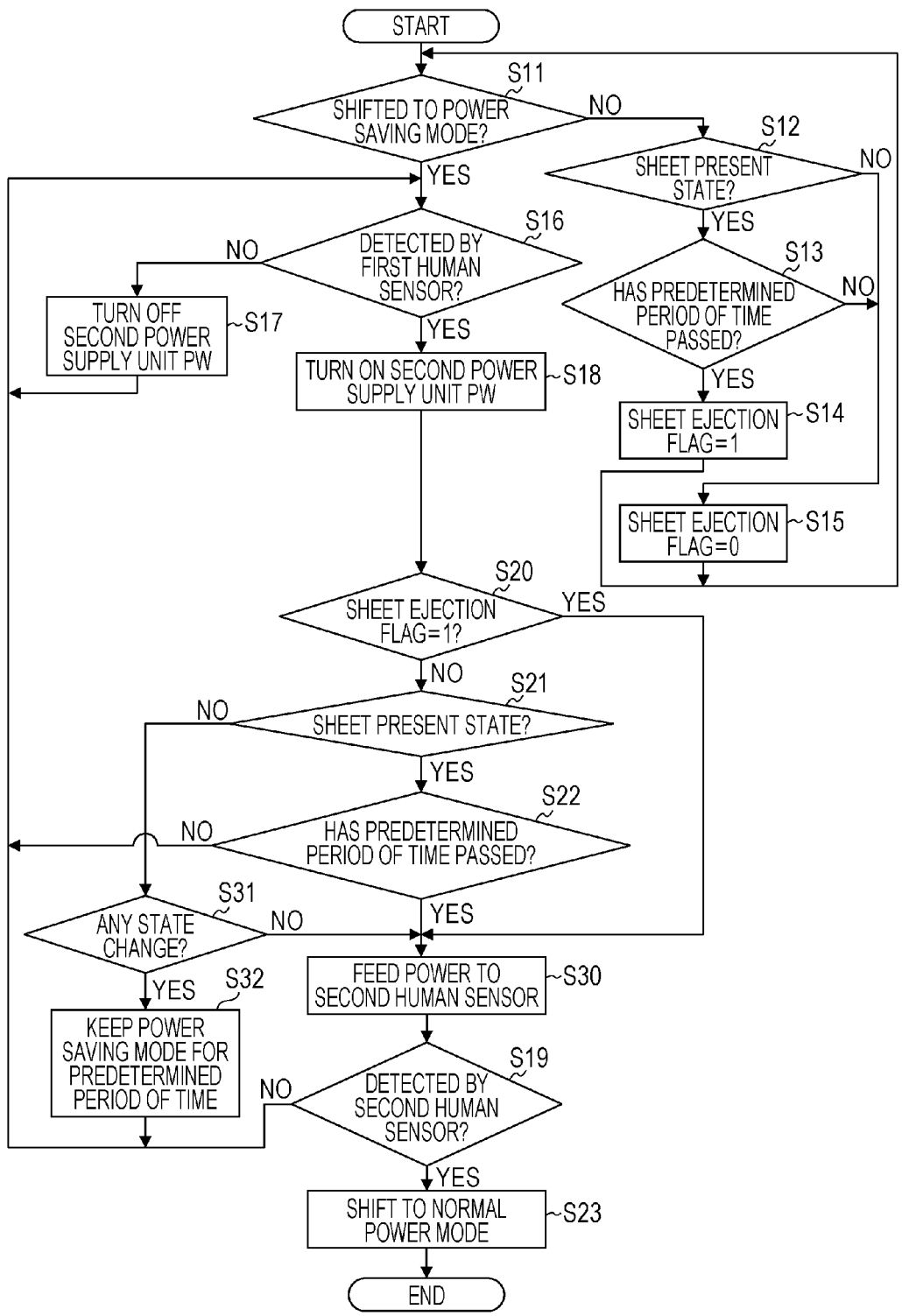

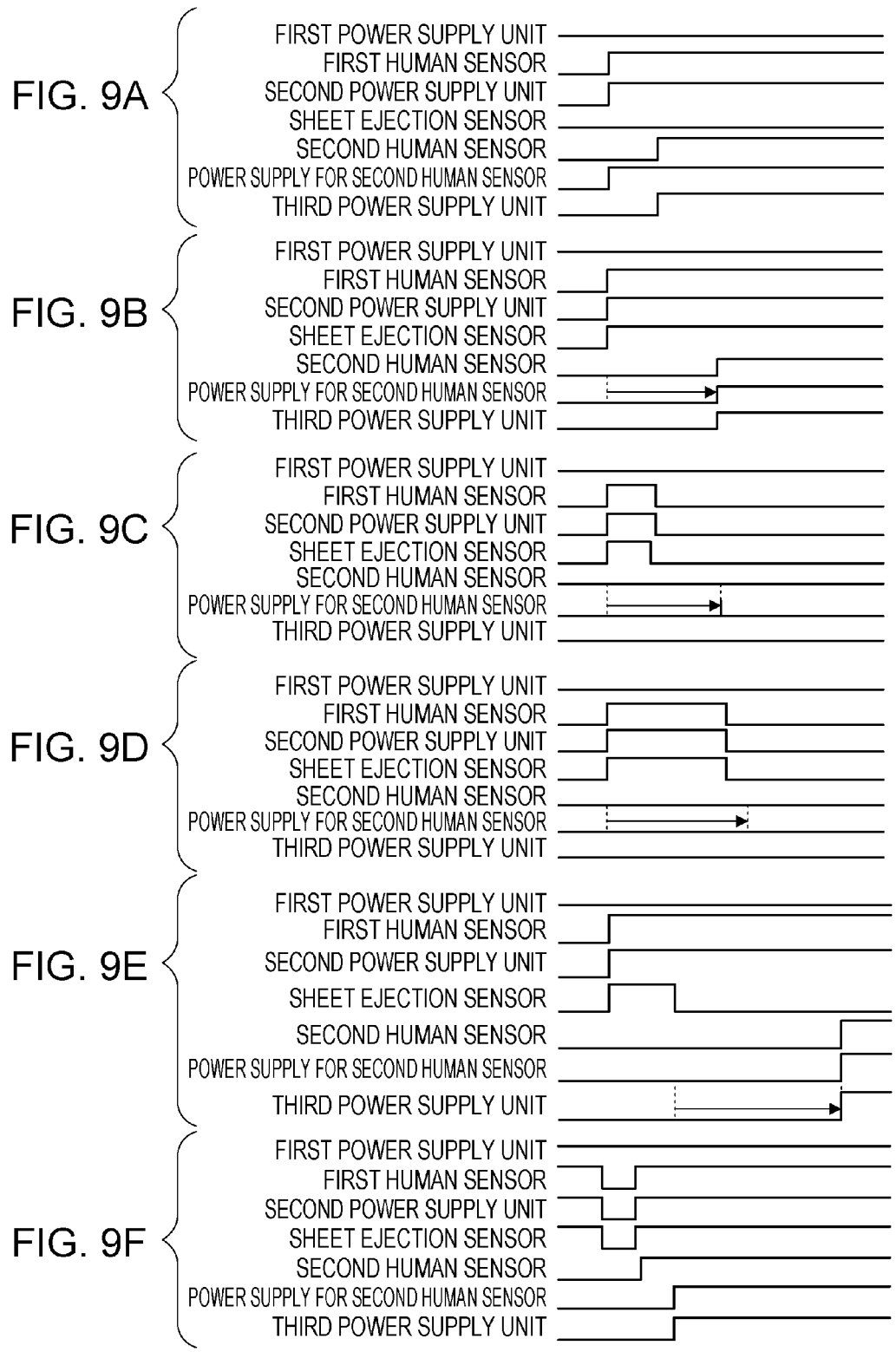

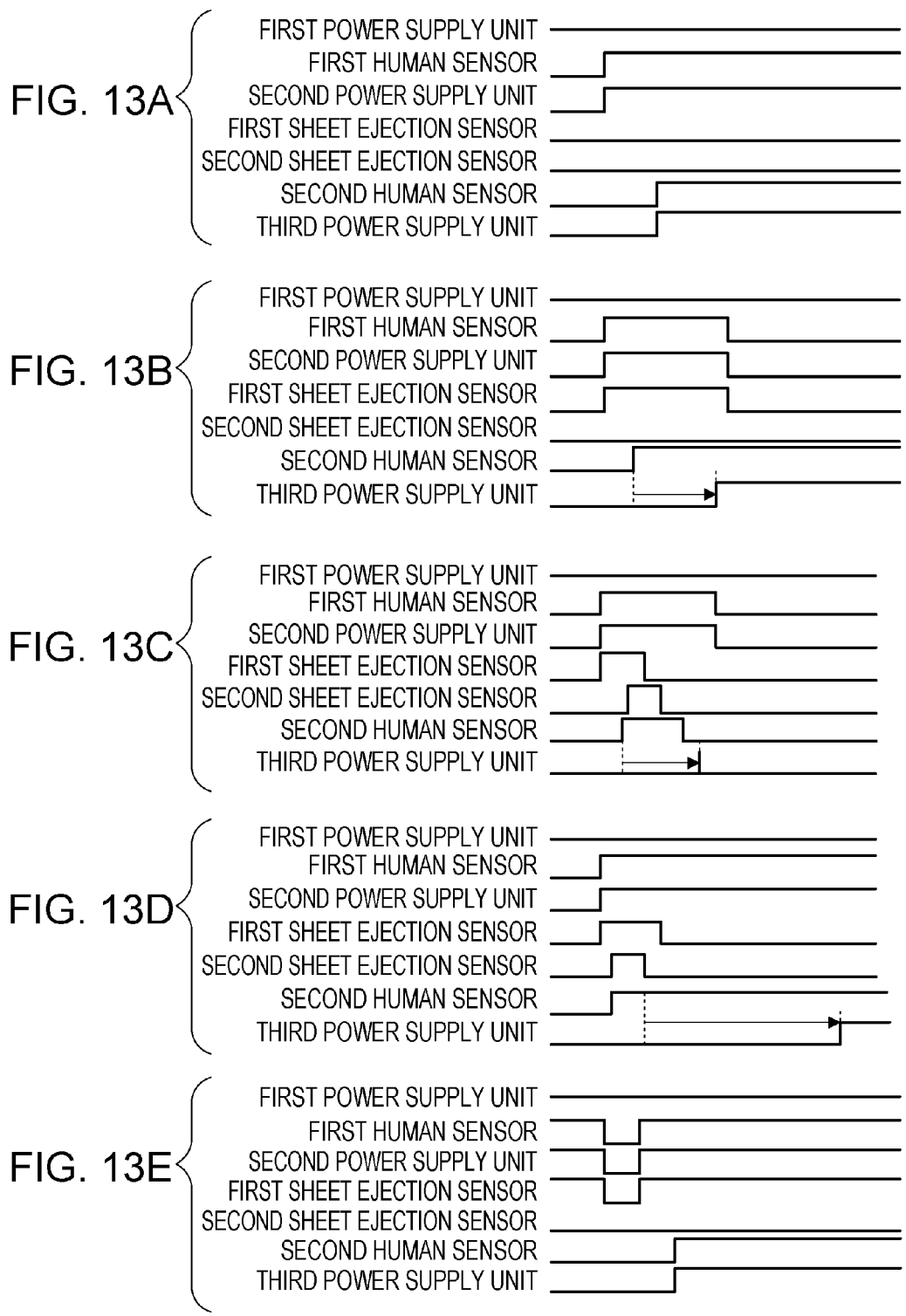

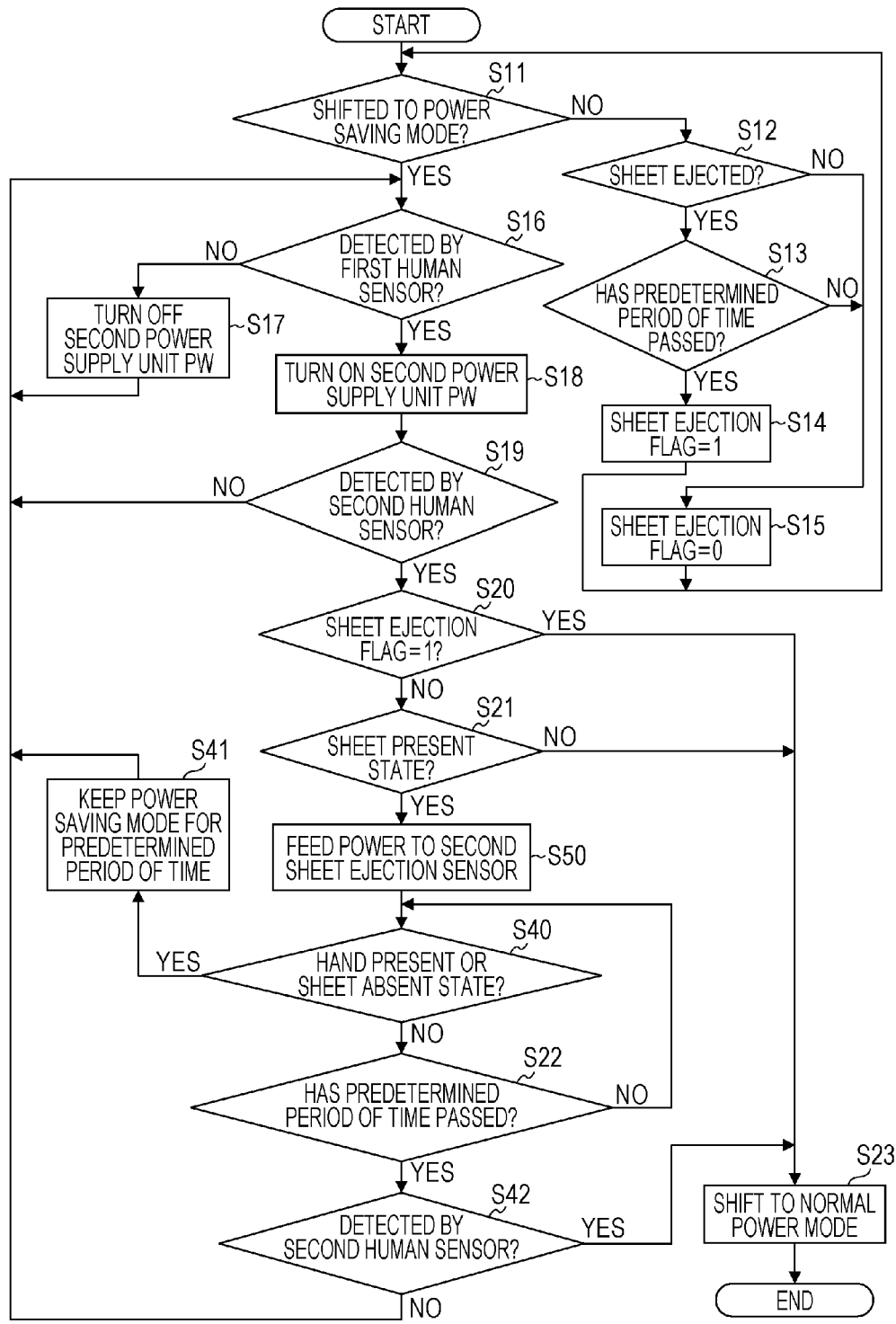

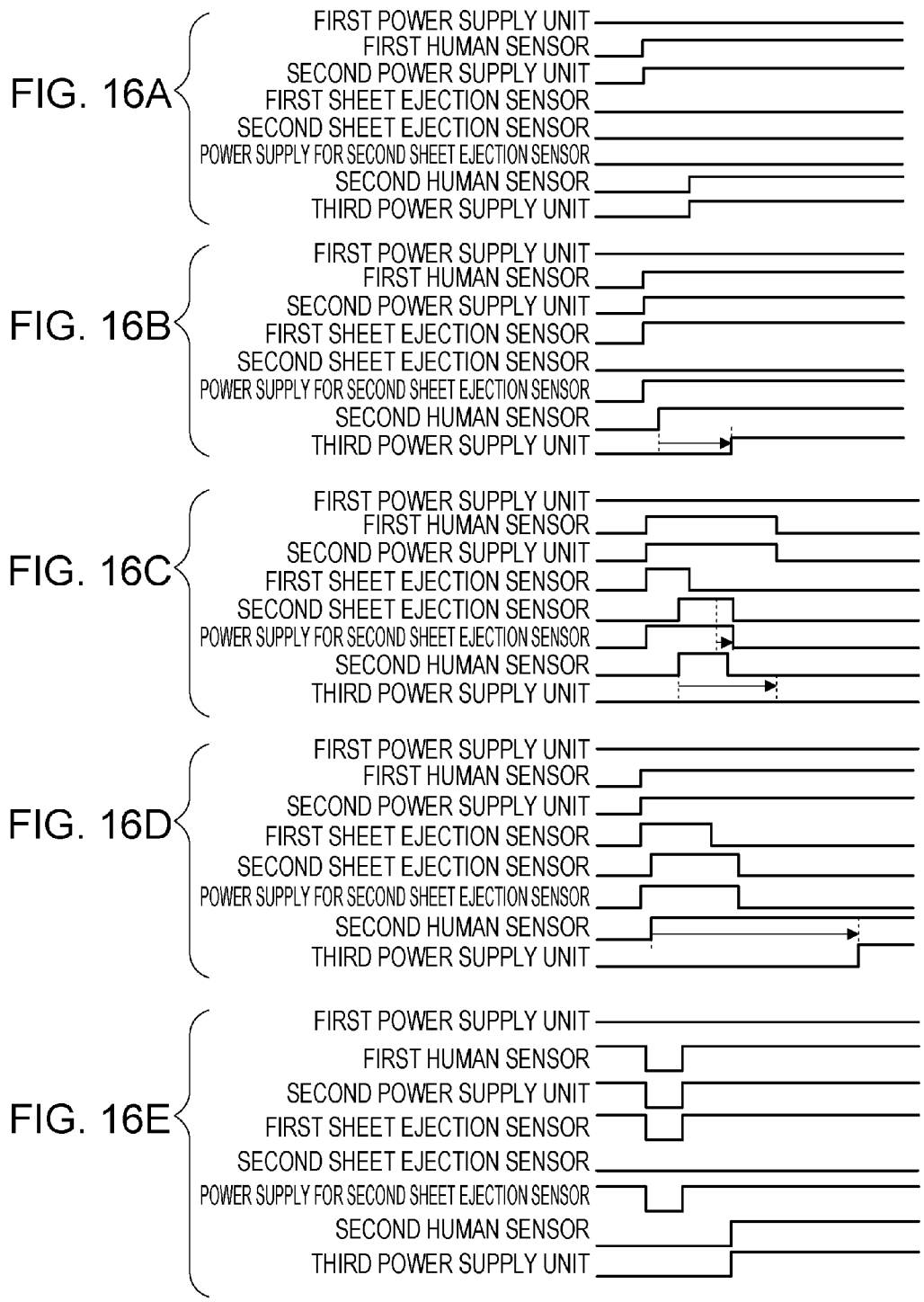

IMAGE PROCESSING APPARATUS AND POWER CONTROL METHOD FOR IMAGE PROCESSING APPARATUS

BACKGROUND OF THE INVENTION

Field of the Invention

The present invention relates to power control for an image processing apparatus with human body detection functionality.

Description of the Related Art

Conventional image processing apparatuses have a plurality of power modes and may support a power-saving mode in which an internal power supply is shut down in accordance with a given power mode. However, return from a power-saving mode to a normal power mode takes time, which reduces user's convenience.

In order to solve the problem, a human body detecting unit may be provided by which a return is executed from a power-saving mode if it determines that a human is approaching (see Japanese Patent Laid-Open No. 2010-217303). The human body detecting unit may be installed in a sheet ejecting unit or a sheet feeding unit to determine a purpose of an approaching user, which may prevent an unnecessary start and thus improve user's convenience. A sheet sensor may further be used to determine the presence of an ejected sheet so that the detection range of a human body detecting unit may be adjusted, which may prevent an unnecessary start.

However, the technology disclosed in Japanese Patent Laid-Open No. 2010-217303 may possibly not determine a purpose of a user who is approaching an image processing apparatus to get a sheet ejected within the apparatus because the user stands in front of an operating unit.

SUMMARY OF THE INVENTION

The present invention provides an image processing apparatus being capable of operating in at least a first power state and a second power state which consumes less power than the first power state, the image processing apparatus including a first detecting unit configured to detect an object, a power control unit configured to shift the image processing apparatus from the second power state to the first power state in a case where the first detecting unit detects an object, and a second detecting unit configured to detect a sheet ejected to a sheet ejecting unit in the image processing apparatus, wherein the power control unit configured not to shift the image processing apparatus from the second power state to the first power state in a case where the second detecting unit no longer detects the sheet ejected to the sheet ejecting unit during a lapse of a predetermined period of time starting from the first detecting unit detecting an object, and configured to shift the image processing apparatus from the second power state to the first power state in a case where the second detecting unit detects the sheet ejected to the sheet ejecting unit before a lapse of the predetermined period of time after the first detecting unit detects an object.

The present invention provides a system which may prevent an unnecessary return from a power-saving mode, improve user's convenience, reduce unnecessary power consumption and extend the life of a limited life component.

Further features of the present invention will become apparent from the following description of exemplary embodiments with reference to the attached drawings.

BRIEF DESCRIPTION OF THE DRAWINGS

FIGS. 6A to 6F are sequence diagrams illustrating examples of a power supply state of the image processing apparatus and detection states of sensors according to the first embodiment.

FIG. 8 is a flowchart illustrating an example of sensor power supply control over the image processing apparatus according to the second embodiment.

FIGS. 9A to 9F are sequence diagrams illustrating examples of a power supply state of the image processing apparatus and detection states of sensors according to the second embodiment.

FIGS. 13A to 13E are sequence diagrams illustrating examples of a power supply state of the image processing apparatus and detection states of sensors according to the third embodiment.

FIG. 15 is a flowchart illustrating an example of sensor power supply control over the image processing apparatus according to the fourth embodiment.

FIGS. 16A to 16E are sequence diagrams of examples of a power supply state of the image processing apparatus and detection states of sensors according to the fourth embodiment.

DESCRIPTION OF THE EMBODIMENTS

Embodiments of the present invention will be described with reference to drawings.

First Embodiment

Figure 1A:
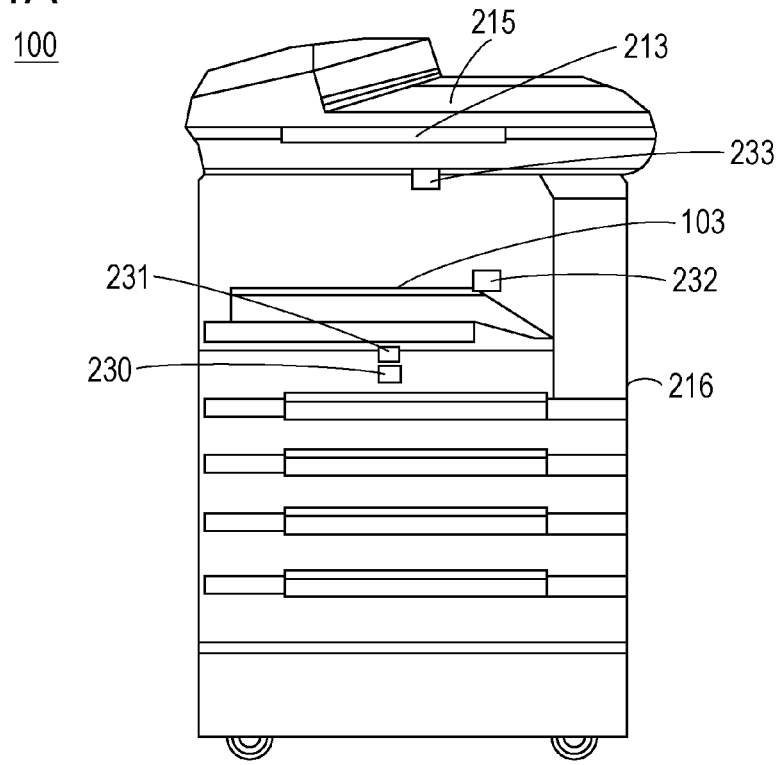
FIGS. 1A and 1B illustrate appearances of an image processing apparatus according to an embodiment of the present invention.
Figure 1B:
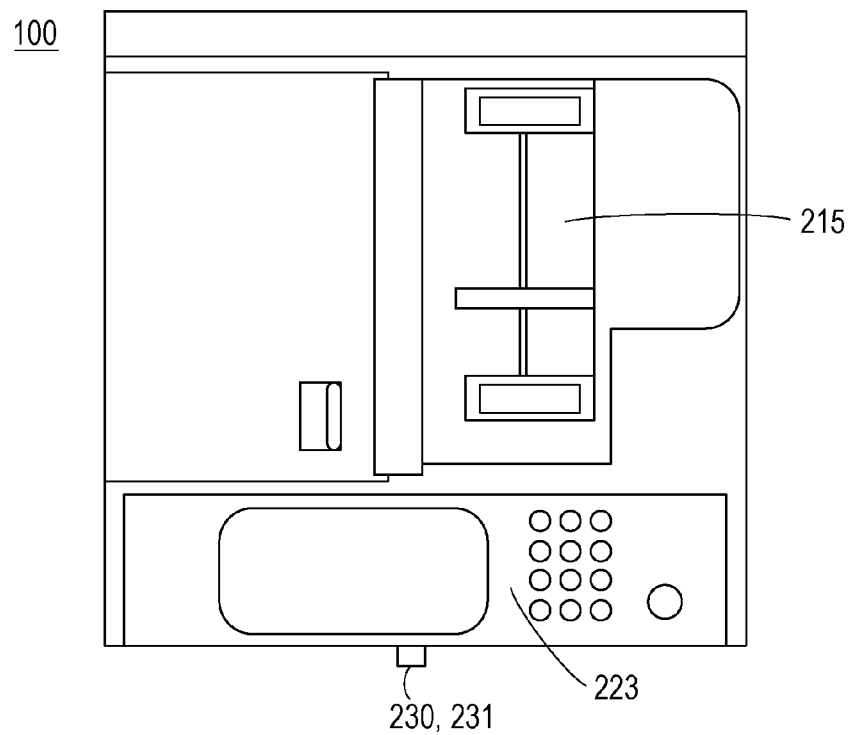

FIGS. 1A and 1B illustrate appearances of an image processing apparatus according to an embodiment of the present invention. FIG. 1A corresponds to a front view of the image processing apparatus. FIG. 1B corresponds to a top view of the image processing apparatus.

As illustrated in FIGS. 1A and 1B, an image processing apparatus 100 includes an operating unit 213, a scanner 215, an internal finisher (internal sheet ejecting unit) 103, and a printer 216. The image processing apparatus 100 has copy, print, facsimile, scan and other functions.

The image processing apparatus 100 is capable of operating in one of a normal power mode (first power state), a power-saving mode 2 (second power state) which consumes less power than the normal power mode, and a power-saving mode 1 (third power state) which consumes less power than the power-saving mode 2.

The image processing apparatus 100 further includes a first human sensor 230 and a second human sensor 231. The first human sensor 230 (first detecting unit) operates in the power-saving mode 1 and has a detection range 111 as in FIGS. 2A and 2B and may broadly detect an object. The second human sensor 231 (second detecting unit) operates in the power-saving mode 2 and has a detection range 112 as illustrated in FIGS. 2A and 2B and may detect an object in a narrower range than that of the first human sensor 230.

Still or mobile objects may be detected by human sensor 230 and the second human sensor 231. According to this embodiment, a human body is to be detected by the first human sensor 230 and human sensor 231. However, an object to be detected by the first human sensor 230 and second human sensor 231 is not limited to a human body. According to this embodiment, the first human sensor 230 and the second human sensor 231 are capable of detecting an approaching human body or other objects.

The image processing apparatus 100 further includes a first sheet ejection sensor 232 and a second sheet ejection sensor 233. The first sheet ejection sensor 232 (sheet-ejection detecting unit) detects that output sheet is in the internal finisher 103. The second sheet ejection sensor 233 (third detecting unit) detects a user's operation (user's hand) to acquire output a sheet and has a detection range 110 as illustrated in FIG. 2A.

Figure 2A:
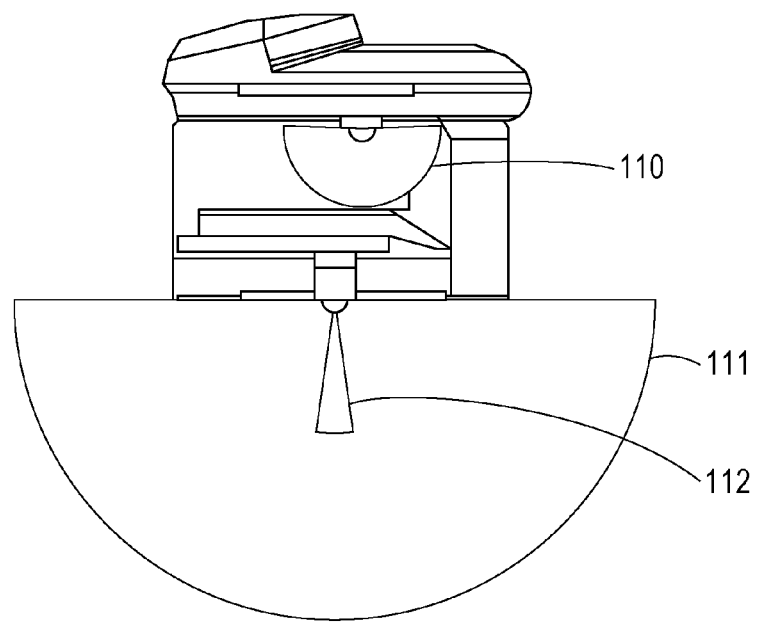
FIGS. 2A and 2B illustrate examples of detection ranges of a human sensor and a sheet ejection sensor.
Figure 2B:
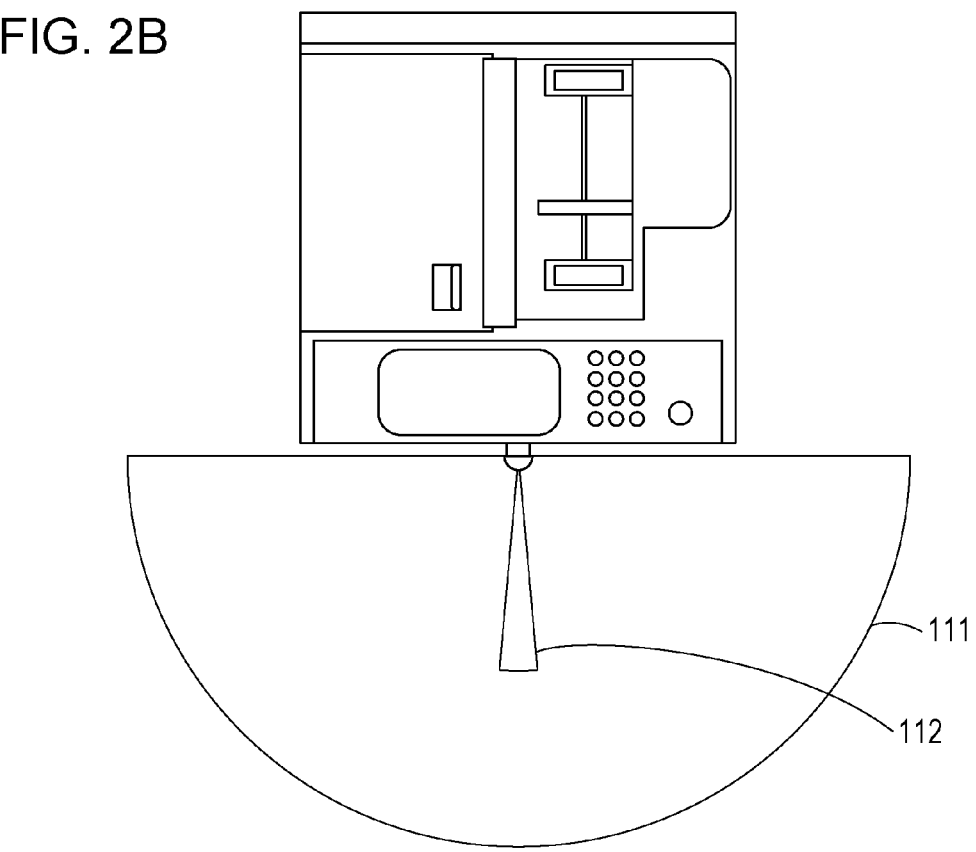

FIGS. 2A and 2B illustrate examples of detection ranges of the human sensors 231 and 230 and the second sheet ejection sensor 233. FIG. 2A illustrates a front view of a detection range of the image processing apparatus 100. FIG. 2B illustrates a top view of the detection range of the image processing apparatus 100.

The human sensors 230 and 231 and the second sheet ejection sensor 233 may be configured by a sensor being capable of detecting a remote object, such as a pyroelectric sensor or a reflection sensor. For example, the first human sensor 230, human sensor 231 and the second sheet ejection sensor 233 may be configured by a pyroelectric sensor, a reflection sensor, and a reflection sensor, respectively. The pyroelectric sensor is a passive human sensor and is capable of detecting a temperature change due to an infrared ray naturally emitted from one having a temperature, such as a human body, to detect an approaching human body. The pyroelectric sensor consumes less power and has a wider detection range. The reflection sensor is an active human sensor and is capable of emitting an infrared ray by itself to detect a human body. The reflection sensor consumes more power than the pyroelectric sensor and has a narrower detection range. The infrared ray sensors used for the sensors 230 to 233 may be a sensor array having N×N infrared ray sensors.

The first sheet ejection sensor 232 may fall if a sheet is left or may be an infrared ray sensor such as a pyroelectric sensor or a reflection sensor. This embodiment will be described with focus on the internal finisher 103. However, a sheet may be externally ejected. The second sheet ejection sensor 233 is provided in an image processing apparatus according to a third or fourth embodiment and is not provided in an image processing apparatus according to a first or second embodiment herein.

Figure 3A:
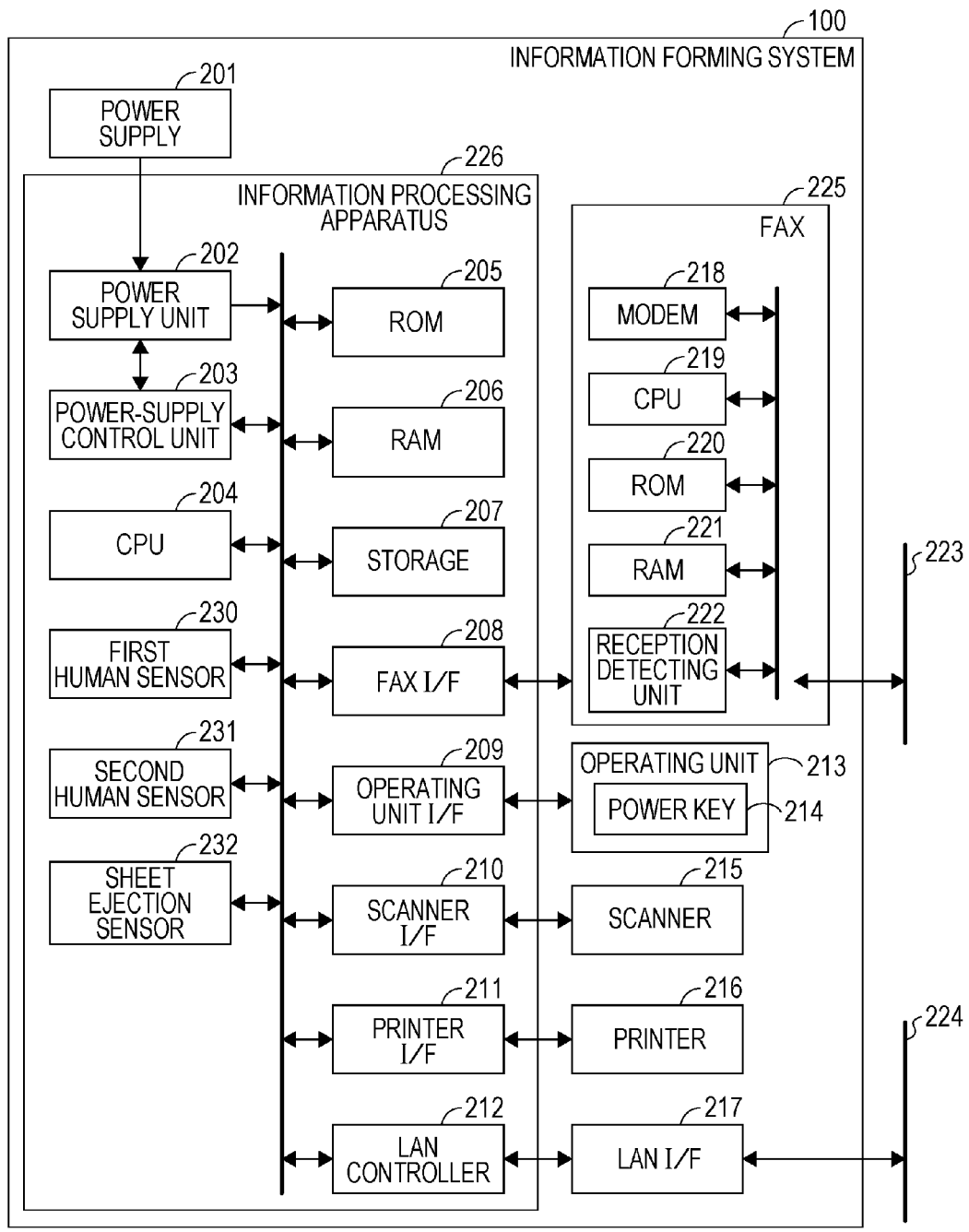
FIGS. 3A to 3C are block diagram illustrating examples of a hardware configuration of an image processing apparatus according to a first embodiment.
Figure 3B:
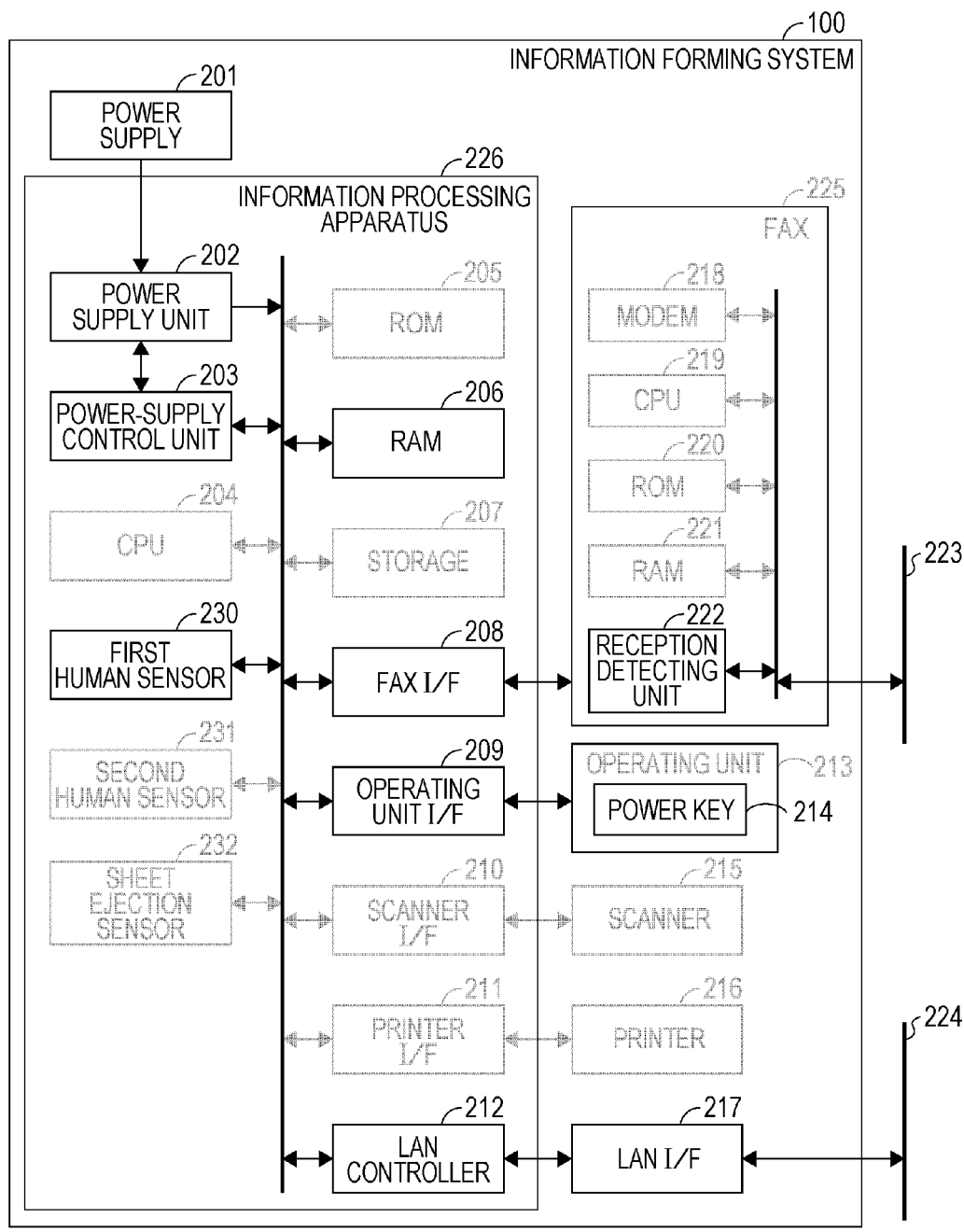
Figure 3C:
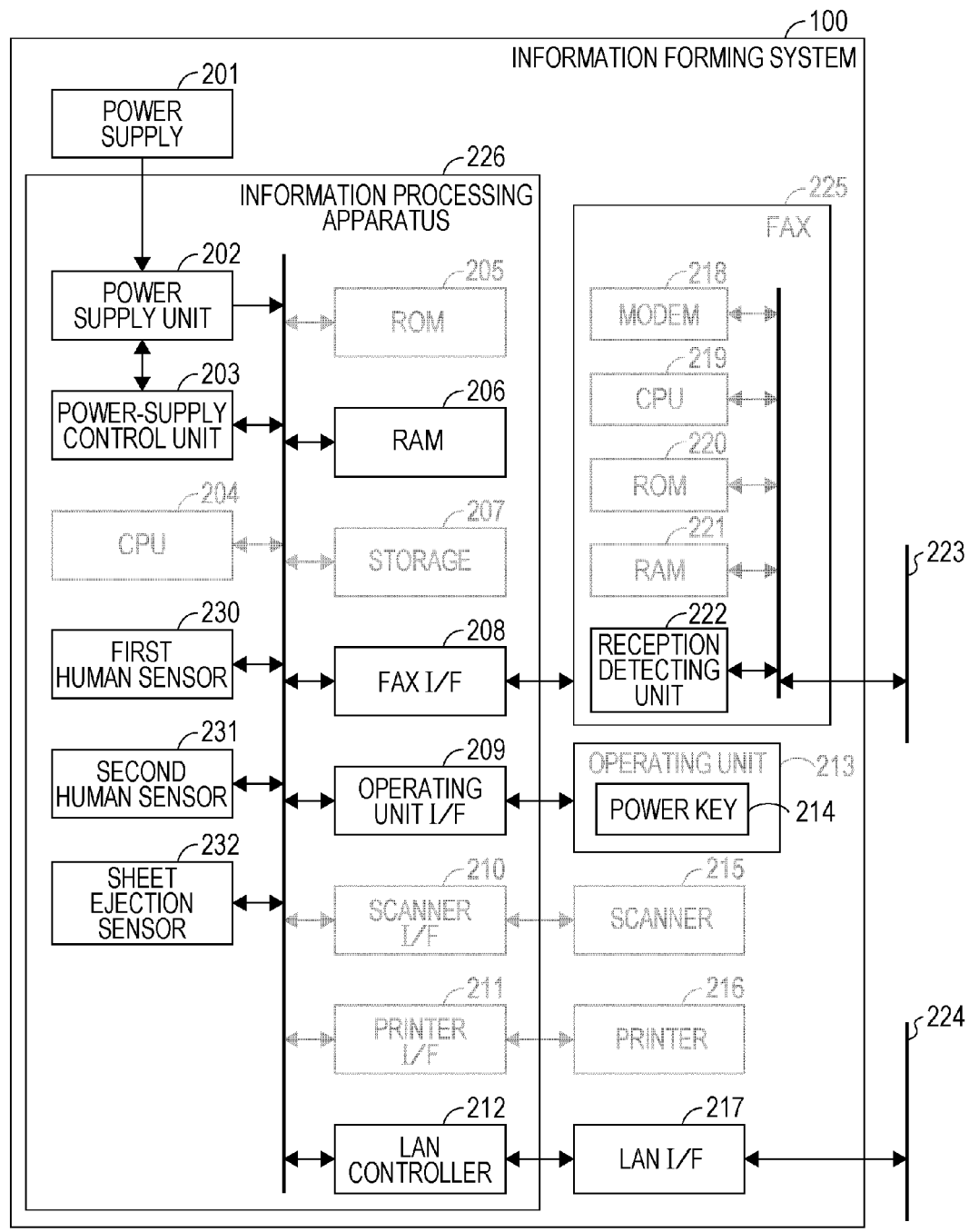

FIGS. 3A to 3C are block diagrams illustrating examples of a hardware configuration of the image processing apparatus 100 according to the first embodiment. Referring to FIG. 3A, an information processing apparatus (controller unit) 226 controls the image processing apparatus 100. The information processing apparatus 226 is connected to a LAN 224 through a LAN controller 212 and is connected to a telephone line 223 through a facsimile 225. An internal configuration of the information processing apparatus 226 will be described below.

A CPU 204 executes a software program which controls over the information processing apparatus 226. A RAM 206 may be used for temporarily storing data when the CPU 204 controls the information processing apparatus 226. The ROM 205 may store a program (such as an apparatus start program) to be executed by the CPU 204 and/or a set value. A storage 207 may be an HDD (hard disk drive) or an SSD (solid state drive) and may be used for various kinds of data.

The operating unit 213 includes a liquid crystal panel for operations and a hard key such as a power key 214 and may receive an instruction input from a user. An operating unit I/F 209 is an interface usable for controlling the operating unit 213 by the CPU 204.

The scanner 215 reads an image on a document mounted on a document stand or an ADF (auto document feeder) and creates an image. The scanner I/F 210 is an interface usable for controlling the scanner 215 by the CPU 204. The printer 216 may print an image based on image data onto a sheet. A printer I/F 211 is an interface usable for controlling a printer by the CPU 204.

The facsimile 225 includes a modem 218, a CPU 219, a RAM 221, a ROM 220, and a reception detecting unit 222. The image processing apparatus 100 controls data communication with a device external to a telephone line through the facsimile 225.

The modem 218 performs modulation for transmission and reception to and from the facsimile 225. The CPU 219 controls transmission and reception by the facsimile 225 through the facsimile I/F 208 in cooperation with the information processing apparatus 226.

The RAM 221 may be used by the CPU 219 for temporary data storage when controlling a device. The ROM 220 may store a start program and a set value for the facsimile 225. Instead of the CPU 219, ROM 220 and RAM 221 in the facsimile 225, the information processing apparatus 226 may have the functions of those components 219 to 221. The facsimile I/F 208 is an interface for control over the facsimile 225 by the CPU 204.

The power-supply control unit 203 controls power supply from the power supply unit 202 to a necessary part (power control). The first human sensor 230 corresponds to the second human sensor illustrated in FIG. 1A and is a sensor configured to broadly detect that a human is approaching. The second human sensor 231 corresponds to the first human sensor 230 illustrated in FIG. 1A and is a sensor configured to detect that a human is approaching in a narrower range than that of the first human sensor 230. The first sheet ejection sensor 232 corresponds to the first sheet ejection sensor 232 illustrated in FIG. 1A and is a sensor configured to detect a state that a sheet is output and is in an internal finisher thereof.

In a "normal power mode", power is supplied to all blocks illustrated in FIG. 3A. In this case, power may be fed to a necessary function only, which however will not be described in detail here.

In the "power-saving mode 1", power is fed to parts of the blocks, as illustrated in FIG. 3B. First, power is supplied from the power supply 201 to the power supply unit 202. Power is supplied from the power supply unit 202 to blocks including the power-supply control unit 203, RAM 206, first human sensor 230, facsimile I/F 208, reception detecting unit 222, power key 214, operating unit I/F 209, LAN controller 212, and LAN I/F 217. Power is not fed to the faded blocks (the CPU 204, ROM 205, storage 207, second human sensor 231, first sheet ejection sensor 232, scanner I/F 210, printer I/F 211, scanner 215, printer 216, and parts (modem 218, CPU 219, ROM 220, and RAM 222) of the facsimile 225). Power may be supplied to the RAM 206 as required and is not necessarily supplied to all. Having described that power is fed to the operating unit 213 through the power key 214 only, power may be fed under a shift condition to another power state of a function of recognizing a user's touch.

Shift conditions to the "power-saving mode 2" and "normal power mode" will be described. First, a shift from the "power-saving mode 1" to the "power-saving mode 2" will be described. If the first human sensor 230 detects that a human is approaching in the "power-saving mode 1", an instruction to shift to the power-saving mode 2 is transmitted to the power-supply control unit 203. The mode is shifted to the "power-saving mode 2" in which power is fed to blocks as illustrated in FIG. 3C. In the "power-saving mode 2", power is fed to the second human sensor 231 and first sheet ejection sensor 232 in addition to the blocks fed in the "power-saving mode 1".

Next, a shift condition to the "normal power mode" will be described. If the reception detecting unit 222 detects a reception of a facsimile in the "power-saving mode 1" or "power-saving mode 2", an instruction to shift to the "normal power mode" is transmitted to the power-supply control unit 203 through the facsimile I/F. Thus, the mode is shifted to the "normal power mode". Also, if the LAN controller 212 receives a job necessary for a shift to the "normal power mode", such as a print job, from the LAN I/F 217, a shift instruction to the "normal power mode" is transmitted to the power-supply control unit 203. Thus, the mode is shifted to the "normal power mode". Also, if it is detected that the power key 214 has been pressed by a user, a shift instruction to the "normal power mode" is transmitted to the power-supply control unit 203 through the operating unit I/F 209. Thus, the mode is shifted to the "normal power mode". Illustrating that the operating unit 213 includes the power key 214 only, the operating unit 213 may be configured to recognize a user's touch and transmit an interrupt signal to the power-supply control unit 203.

Next, differences between the "power-saving mode 2" and the "power-saving mode 1" will be described. In the "power-saving mode 2", while the first human sensor 230 is detecting that a human stays close, the "power-saving mode 2" is kept. If the first human sensor 230 does not detect a human and it is determined that a human has left, a shift instruction to the "power-saving mode 1" is transmitted to the power-supply control unit 203. Thus, the mode is shifted to the "power-saving mode 1".

If the second human sensor 231 detects that a human is approaching in the "power-saving mode 2", a shift instruction to the "normal power mode" is transmitted to the power-supply control unit 203. Thus, the mode is shifted to the "normal power mode". If the second human sensor 231 detects that a human is approaching while the first sheet ejection sensor 232 detects the presence of a sheet in the internal finisher 103, the shift to the normal power mode in response to a human detection by the second human sensor 231 is temporarily restricted.

Figure 4A:
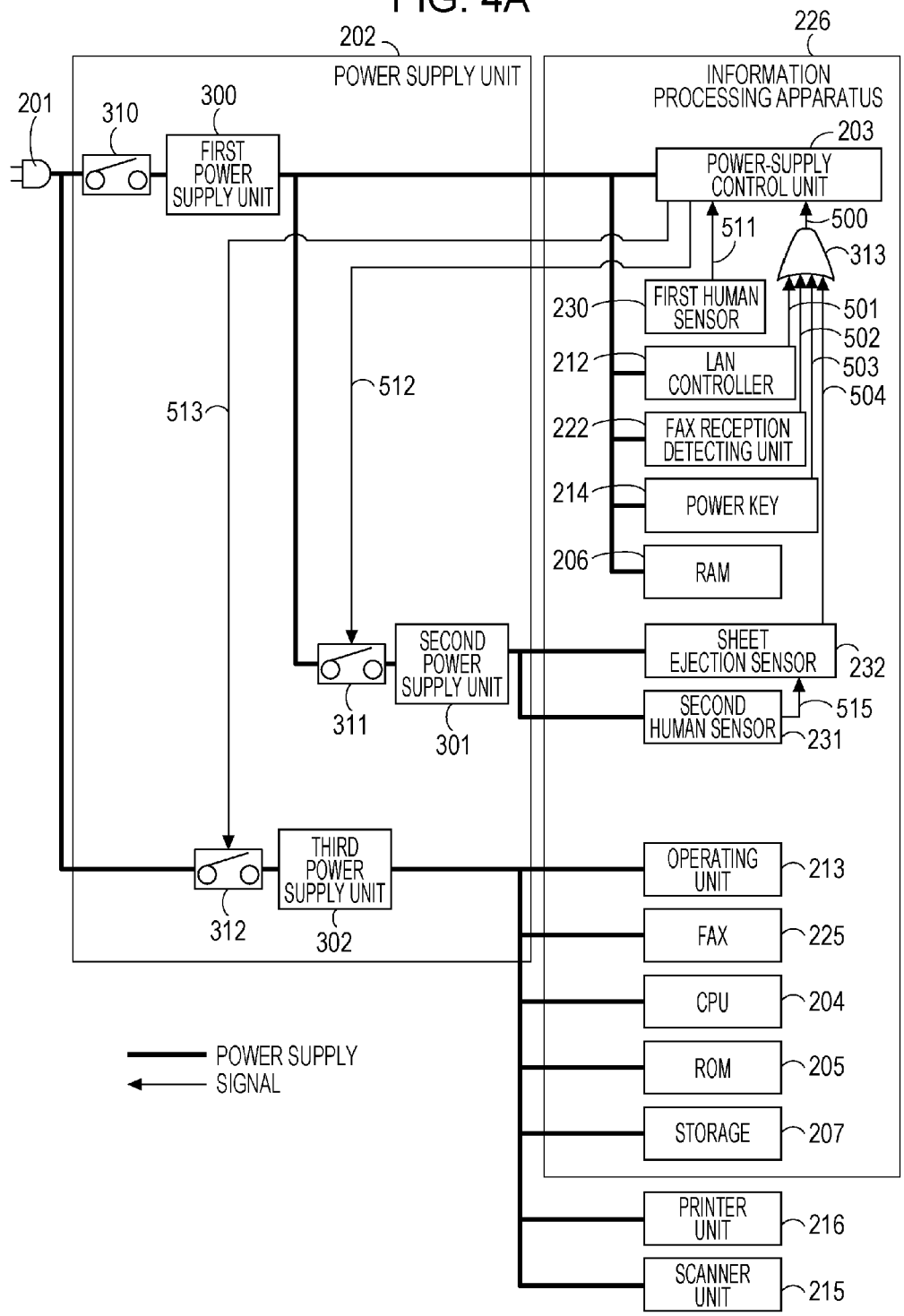
FIG. 4A is a block diagrams illustrating examples of a power feeding configuration of the image processing apparatus according to the first embodiment.

A power mode shift using a sensor according to the first embodiment will be described in detail with reference to FIGS. 4A and 4B. FIG. 4A is a block diagram illustrating an example of a power feeding configuration of the image processing apparatus 100 according to the first embodiment. Like numbers refer to like parts throughout. Power input from the power supply 201 is connected to an SW 310 and an SW 312. The SW 310 may be a seesaw SW or a button SW that may be turned on by the power-supply control unit 203 or manually by a user.

If the SW 310 is turned on, power supplied from the power supply 201 is fed to the first power supply unit 300. The first power supply unit 300 is configured to supply power to blocks that operate in the power-saving mode 1, power-saving mode 2, and normal power mode.

If the SW 311 is turned on, power supplied from the first power supply unit 300 is fed to the second power supply unit 301. The second power supply unit 301 is configured to supply power to a block that operates in the power-saving mode 2 and normal power mode. The second power supply unit 301 may be directly fed by the power supply 201 or be fed by the first power supply unit 300.

If the SW 312 is turned on, power supplied from the power supply 201 is fed to the third power supply unit 302. The third power supply unit 302 is configured to feed power to a block that operates in the normal power mode. The third power supply unit 302 may be directly fed by the power supply 201 or may be fed by the first power supply unit 300.

The SW 311 and SW 312 may only be required to be a device having a switchable feeding state, such as a relay and an FET. If the SW 310 is turned on, an ON instruction 512 and an ON instruction 513 may be automatically transmitted from the power-supply control unit 203 to the SW 311 and SW 312, respectively, to shift to the normal power mode.

A condition for shifting from the power-saving mode 1 to the power-saving mode 2 is that the first human sensor 230 detects a human. If the first human sensor 230 detects a human, a request signal 511 for turning on the SW 311 is transmitted to the power-supply control unit 203. If the power-supply control unit 203 receives the request signal 511, the ON instruction 512 is transmitted to the SW 311. Thus, power is fed to the second power supply unit 301.

Next, a condition for shifting to the normal power mode will be described. If a logic 313 receives at least one of request signals (501 to 504, and 511) that request a shift to the normal power mode, a shift request signal 500 is transmitted to the power-supply control unit 203. The request signals will be described below.

If the LAN controller 212 receives a shift instruction to the normal power mode such as a print job, a request instruction 501 is transmitted to the logic 313. The LAN controller 212 receives an instruction through the LAN I/F 217 though the LAN I/F 217 is not illustrated in FIG. 4A.

If the reception detecting unit 222 detects a reception of a facsimile, a request instruction 502 is transmitted to the logic 313. The request instruction 502 is transmitted to the logic 313 through the facsimile I/F 208 though the facsimile I/F 208 is not illustrated in FIG. 4A.

If the power key 214 is pressed by a user, a request instruction 503 is transmitted to the logic 313. The request instruction 503 is transmitted to the logic 313 through the operating unit I/F 209 though the operating unit I/F 209 is not illustrated in FIG. 4A.

If a shift to the normal power mode is determined on basis of a detection state of the first sheet ejection sensor 232 or second human sensor 231 fed by the second power supply unit 301, a request instruction 504 is transmitted to the logic 313. Details thereof will be described below with reference to FIG. 4B.

If the power-supply control unit 203 receives the shift request signal 500 from the logic 313, the power-supply control unit 203 transmits the ON instruction 513 to the SW 312. Thus, power is fed to the third power supply unit 302. The third power supply unit 302 feeds power to a block to be used in the normal power mode. If the power-supply control unit 203 receives the shift request signal 500 in the power-saving mode 1, the power-supply control unit 203 may further transmit an ON instruction 512 to the SW 311. The power fed from the power supply 201 is distributed to three of the first power supply unit 300, second power supply unit 301, and third power supply unit 302. FIG. 4A does not illustrate the scanner I/F 210 and printer I/F 211.

Figure 4B:
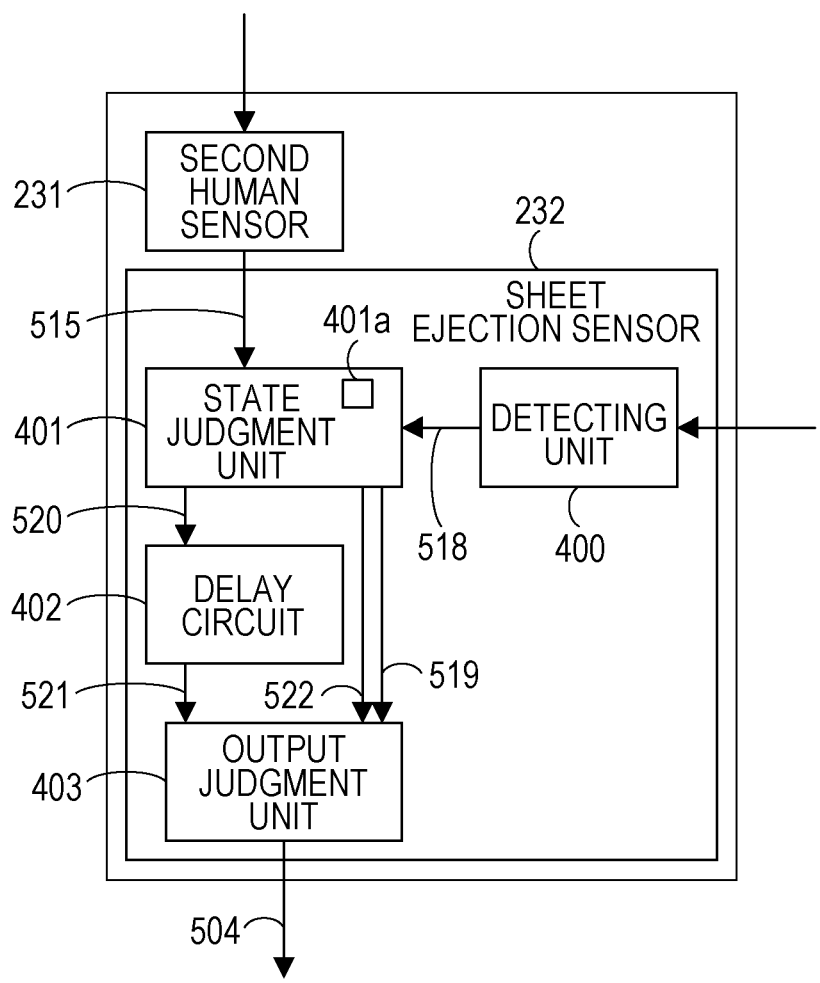
FIG. 4B is a detail block diagram regarding a sheet ejection sensor and a second human sensor according to the first embodiment.

FIG. 4B is a detail block diagram including the first sheet ejection sensor 232 and the second human sensor 231 according to the first embodiment. A detecting unit 400 within the first sheet ejection sensor 232 outputs to a state judgment unit 401a signal 518 indicative of the presence of a sheet within the internal finisher 103. Similarly, the second human sensor 231 outputs to the state judgment unit 401a signal 515 indicative of the presence of a human.

The state judgment unit 401 judges a sheet detection state of the detecting unit 400. If the detecting unit 400 detects a sheet even while the second human sensor 231 is detecting a human in the power-saving mode 2, a shift to the normal power mode is controlled to delay. This will be described below more specifically.

If the signal 518 has a Low state (or if the detecting unit 400 does not detect a sheet), the state judgment unit 401 outputs to an output judgment unit 403 a signal 519 that is the signal 515 input from the second human sensor 231. If the output judgment unit 403 judges that the input signal 519 from the state judgment unit 401 has a High state (or if the second human sensor 231 is detecting a human), the output judgment unit 403 transmits a request instruction 504 to the logic 313. This allows transmission of the ON instruction 513 from the power-supply control unit 203 to the SW 312, feeding to the third power supply unit 302 and thus shifting the image processing apparatus 100 to the normal power mode.

On the other hand, if the signal 518 has a High state (or if the detecting unit 400 is detecting a sheet), the state judgment unit 401 outputs to a delay circuit 402 the signal 515 input from the second human sensor 231 as a signal 520. The delay circuit 402 delays the signal 520 input from the state judgment unit 401 by a predetermined period of time (such as a first period of time that is an assumed time sufficient for a human to acquire a sheet and leave from the detection range 112 (FIG. 2) of the second human sensor 231 from a detection of the second human sensor 231) and outputs it as a signal 521 to the output judgment unit 403. If the output judgment unit 403 judges that the input signal 521 from the delay circuit 402 has a High state (or if the second human sensor 231 is detecting a human), the output judgment unit 403 transmits a request instruction 504 to the logic 313. This allows, with a delay of the predetermined period of time (first period of time) from a detection of a human by the second human sensor 231, transmission of the ON instruction 513 from the power-supply control unit 203 to the SW 312, feeding to the third power supply unit 302 and shifting of the image processing apparatus 100 to the normal power mode.

If the signal 515 from the second human sensor 231 changes from a human detecting state (High) to a non-detecting state (Low) while the feeding to the third power supply unit 302 is being delayed (or before a lapse of the first period of time), the state judgment unit 401 shifts a disable signal 522 that disables the delay signal 521 from the delay circuit 402 to a High state and transmits it to the output judgment unit 403. If the disable signal 522 has a High state, the output judgment unit 403 does not output a request instruction 504 even when the delay signal 521 is shifted to a High state. The state judgment unit 401 holds the disable signal 522 at a High state for a predetermined period of time (at least the first period of time). In other words, the shift to the normal power mode with the delayed signal is not performed. If the first human sensor 230 no longer detects a human even while the state judgment unit 401 is holding the disable signal 522 at a High state, the image processing apparatus 100 shifts to the power-saving mode 1.

While the feeding to the third power supply unit 302 is being delayed (before a lapse of the first period of time), the signal 515 from the second human sensor 231 has a human detecting state (High). When the detecting unit 400 shifts the signal 518 from a human detecting state (High) to a non-detecting state (Low), the state judgment unit 401 transmits the disable signal 522 to the output judgment unit 403. The state judgment unit 401 holds the disable signal 522 at a High state for a predetermined period of time (at least the first period of time). The state judgment unit 401 does not output the signal 519 and signal 520 for a predetermined period of time (such as a second period of time that is an assumed time sufficient for a human having acquired a sheet to leave the detection range 112 (FIG. 2) of the second human sensor 231). In other words, the power-saving mode is maintained for the predetermined period of time (second period of time).

If the signal 518 keeps a High state (or a state the detecting unit 400 is detecting a sheet) for a predetermined period of time (such as a third period of time that is an assumed time sufficient for a human to come for a sheet from start of a print job) or longer in the normal power mode, the state judgment unit 401 stores "1" as an ejection flag at a register 401a within the state judgment unit 401. If the ejection flag is "1" in the power-saving mode, the state judgment unit 401 outputs the signal 515 input from the second human sensor 231 as a signal 519 to the output judgment unit 403, irrespective of the signal 518. Thus, when a sheet is left within the internal finisher 103 for a predetermined period of time (third period of time) or longer and if the second human sensor 231 detects a human, the mode is shifted to the normal power mode independent of the sheet detecting state by the detecting unit 400. The state judgment unit 401, delay circuit 402, and output judgment unit 403 may be provided within the second human sensor 231.

Power supply to sensors controlled by this configuration in the image processing apparatus 100 will be described with reference to the flowchart in FIG. 5. The flowchart in FIG. 5 does not illustrate a job reception by the LAN controller 212, a detection of a received facsimile by the reception detecting unit 222, a shift to the normal power mode under a shift condition such as a press on the power key 214. However, it should be understood that if a shift instruction based on a shift condition as described above is received by the power-supply control unit 203 during the processing illustrated in FIG. 5, the mode is shifted to the normal power mode.

Figure 5:
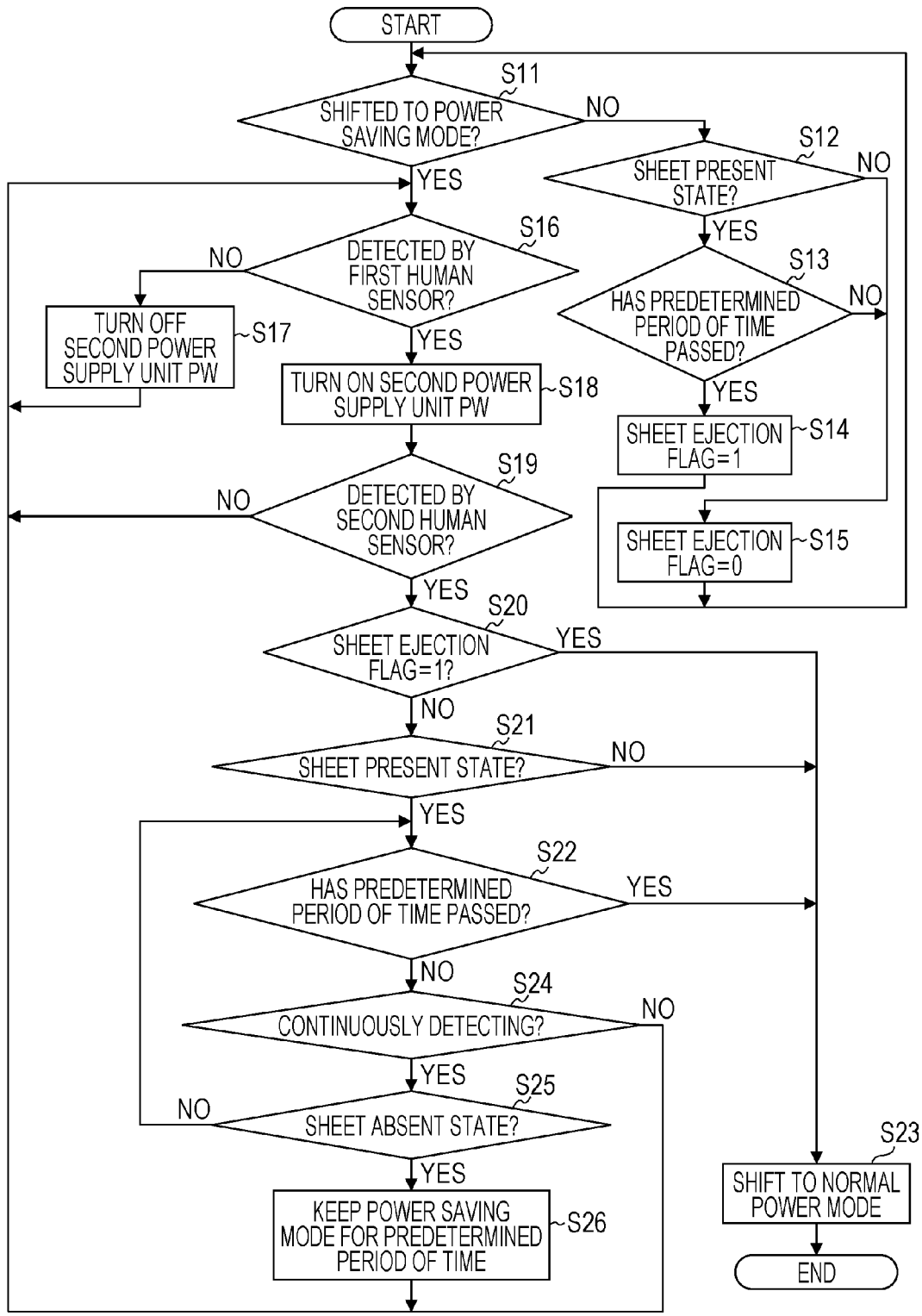
FIG. 5 is a flowchart illustrating an example of a sensor power supply control over the image processing apparatus according to the first embodiment.

FIG. 5 is a flowchart illustrating an example of sensor power supply control by the image processing apparatus 100 according to the first embodiment. The image processing apparatus 100 performs processing in steps S12 to S15 if the normal power mode is not shifted to the power-saving mode (No in step S11) or in the normal power mode. In step S12, the state judgment unit 401 in the first sheet ejection sensor 232 determines whether any ejected sheet is present on the internal finisher 103 on basis of the input signal 518 from the detecting unit 400.

If it is determined that a sheet is present (Yes in S12), the state judgment unit 401 advances the processing to step S13. In step S13, the state judgment unit 401 determines whether the sheet present state has been kept for a predetermined period of time (third period of time) or longer.

If it is determined that the sheet present state has been kept for the predetermined period of time (third period of time) (Yes in S13), the state judgment unit 401 stores "1" as an ejection flag at the register 401a within the state judgment unit 401 (S14). This may correspond to determination on whether a printed sheet has been left. If the predetermined period of time (third period of time) has passed, there is a possibility that a printed sheet has been left, and a next user approaching thereto may use the image processing apparatus 100. The predetermined period of time designated above may be set in advance by assuming a time from start of a print job to removal of the printed sheet. If a shift to the power-saving mode is disabled, no ejection flag is used.

On the other hand, if it is determined that a sheet present state has not been kept for the predetermined period of time (third period of time) (No in S13), the state judgment unit 401 stores "0" as an ejection flag at the register 401a within the state judgment unit 401 (S15).

If it is determined in step S12 above that no sheet has been ejected onto the internal finisher 103 (No in S12), the state judgment unit 401 stores "0" as an ejection flag at a register within the state judgment unit 401 (S15).

After step S14 or S15, if the mode is not shifted to the power-saving mode (No in S11), the state judgment unit 401 performs processing in steps S12 to S15 again. If the normal power mode is shifted to the power-saving mode (Yes in S11), that is, in the power-saving mode, the image processing apparatus 100 performs processing in step S16 and subsequent steps.

If the first human sensor 230 does not detect a human (No in S16), the image processing apparatus 100 turns off the power supply from the second power supply unit 301 (S17) and returns the processing to step S16. In step S17, the power-supply control unit 203 issues a shift instruction to the power-saving mode 1 to the power supply unit 202 (or outputs an OFF instruction to the SW 311) to turn off the power supply to the second power supply unit 301. When the feeding to the second power supply unit 301 stops, the feeding to the second human sensor 231 and the first sheet ejection sensor 232 stop.

On the other hand, if the first human sensor 230 detects a human (Yes in S16), the image processing apparatus 100 turns on feeding to the second power supply unit 301 (S18). In step S18, the power-supply control unit 203 issue a shift instruction to the power-saving mode 2 to the power supply unit 202 (or outputs an ON instruction to the SW 311) to turn on feeding to the second power supply unit 301. When the feeding to the second power supply unit 301 starts, the feeding to the second human sensor 231 and the first sheet ejection sensor 232 starts to activate them.

If the second human sensor 231 does not detect a human (No in S19), the image processing apparatus 100 performs power supply control based on a detection result from the first human sensor 230 (S16 to S18).

On the other hand, if the second human sensor 231 detects a human (Yes in S19), the image processing apparatus 100 performs processing in step S20 and subsequent steps. If the first sheet ejection sensor 232 determines that the ejection flag is "1" (Yes in S20), the first sheet ejection sensor 232 outputs a request instruction 504 for a shift to the normal power mode (S23). If the ejection flag is "1", it means that a sheet has been left for the predetermined period of time (third period of time) or longer. In this case, the first sheet ejection sensor 232 determines that there is a high possibility that a detected user may use the image processing apparatus 100, and the mode is shifted to the normal power mode. More specifically, the state judgment unit 401 outputs an input signal 515 from the second human sensor 231 as an output signal 519 to the output judgment unit 403, and the output judgment unit 403 outputs the request instruction 504. Thus, the power-supply control unit 203 issues a shift instruction to the normal power mode to the power supply unit 202 (or outputs an ON instruction to the SW 312) and turns on the feeding to the third power supply unit 302. This shifts the mode to the normal power mode.

On the other hand, if it is determined that the ejection flag is not "1" (No in S20), the first sheet ejection sensor 232 performs control on basis of whether the detecting unit 400 has detected a sheet on the internal finisher 103 (sheet present state) or not (sheet absent state).

If the first sheet ejection sensor 232 determines a "sheet absent state" (No in S21), the first sheet ejection sensor 232 outputs a request instruction 504 for a shift to the normal power mode (S23). More specifically, the state judgment unit 401 outputs the input signal 515 from the second human sensor 231 as an output signal 519 to the output judgment unit 403, and the output judgment unit 403 outputs a request instruction 504. Thus the power-supply control unit 203 turns on feeding to the third power supply unit 302, and the mode is shifted to the normal power mode.

On the other hand, if a "sheet present state" is determined (Yes in S21), the first sheet ejection sensor 232 controls to delay a shift to the normal power mode. More specifically, the state judgment unit 401 outputs an input signal 515 from the second human sensor 231 as an output signal 520 to the delay circuit 402. The state judgment unit 401 further determines whether the state that the second human sensor 231 keeps detecting a human in the "sheet present state" has passed for a predetermined period of time (a delay time (first period of time) by the delay circuit 402) (S22).

If the state judgment unit 401 determines that predetermined period of time has not passed (No in S22), the first sheet ejection sensor 232 (or state judgment unit 401 more specifically) advances the processing to step S24. If it is determined that the second human sensor 231 keeps detecting a human and the detecting unit 400 is detecting a sheet on the internal finisher 103 (sheet present state) (Yes in S24 and No in S25), the first sheet ejection sensor 232 (or state judgment unit 401 more specifically) returns the processing to step S22 and awaits a lapse of the predetermined period of time.

If the state that the second human sensor 231 is keeping detecting a human in the sheet present state has been kept for the predetermined period of time (Yes in S22), the first sheet ejection sensor 232 outputs a request instruction 504 for a shift to the normal power mode (S23). More specifically, the delay circuit 402 outputs an output signal 521 having a High state to the output judgment unit 403, and the output judgment unit 403 outputs a request instruction 504. Thus, the mode is shifted to the normal power mode.

If the second human sensor 231 no longer detect a human continuously before a lapse of the predetermined period of time (No in S24), the image processing apparatus 100 returns the processing to step S16. More specifically, if the signal 515 shifts from a High state to a Low state, the judgment unit 401 transmits a disable signal 522 (High state) to the output judgment unit 403 for at least the first period of time. This may prevent a return to the normal power mode based on a human detection by the second human sensor 231. The image processing apparatus 100 as a whole executes the processing in step S16 and subsequent steps.

If a "sheet absent state" is determined though the second human sensor 231a is continuously detecting before a lapse of the predetermined period of time (Yes in S24 and Yes in S25), the image processing apparatus 100 determines that an approaching human comes to acquire a printed material, keeps the power-saving mode for a predetermined period of time (or the second period of time here) (S26), and returns the processing to S16. More specifically, the state judgment unit 401 transmits a disable signal 522 (High) to the delay circuit 402 for at least the first period of time for control to prevent output of the signals 519 and 520 for a predetermined period of time (or the second period of time). Even while the state judgment unit 401 is holding the disable signal 522 at a High state, if the first human sensor 230 no longer detects a human, the image processing apparatus 100 shifts to the power-saving mode 1, though not illustrated. Thus, the power-saving mode 1 or 2 is kept for a predetermined period of time (or the second period of time). The image processing apparatus 100 as a whole performs the processing in step S16 and subsequent steps.

FIGS. 6A to 6F are sequence diagrams showing examples of power supply states of the image processing apparatus 100 and detection states of the sensors according to the first embodiment. FIG. 6A is a sequence diagram where the first sheet ejection sensor 232 does not detect a sheet. In the image processing apparatus 100, the second power supply unit 301 is fed if the first human sensor 230 detects a human. Next, in the image processing apparatus 100, the third power supply unit 302 is fed, and the mode is shifted to the normal power mode if the first sheet ejection sensor 232 does not detect a sheet but the second human sensor 231 detects a human.

FIG. 6B is a sequence diagram where the first sheet ejection sensor 232 detects a sheet and it is determined that a user is approaching to use the image processing apparatus 100. In the image processing apparatus 100, the second power supply unit 301 is fed if the first human sensor 230 detects a human. Next in the image processing apparatus 100, because the second human sensor 231 detects a human but the first sheet ejection sensor 232 is detecting a sheet, the feeding to the third power supply unit 302 is delayed temporarily (for the first period of time). Even after the delay ends, if the first sheet ejection sensor 232 is still detecting a sheet and the second human sensor 231 is continuously detecting a human, the third power supply unit 302 is fed, and the mode is shifted to the normal power mode, in the image processing apparatus 100.

FIG. 6C is a sequence diagram where the first sheet ejection sensor 232 detects a sheet and it is determined that a user is coming to the image processing apparatus 100 to acquire an output sheet. In the image processing apparatus 100, the second power supply unit 301 is fed if the first human sensor 230 detects a human. Next in the image processing apparatus 100, because the second human sensor 231 detects a human but the first sheet ejection sensor 232 is detecting a sheet, the feeding to the third power supply unit 302 is delayed temporarily (for the first period of time). If the first sheet ejection sensor 232 determines the "sheet absent state" before the feeding to the third power supply unit 302 starts (before the end of the delay) and the second human sensor 231 shifts to a non-detecting state, the power-saving mode is kept in the image processing apparatus 100.

FIG. 6D is a sequence diagram where the first sheet ejection sensor 232 detects a sheet, and a sheet is output by a plurality of users, and it is determined that one of the human users is coming to the image processing apparatus 100 to acquire the output sheet. In the image processing apparatus 100, if the first human sensor 230 detects a human, the second power supply unit 301 is fed. Next, in the image processing apparatus 100, because the second human sensor 231 detects a human but the first sheet ejection sensor 232 is detecting a sheet, the feeding to the third power supply unit 302 is delayed temporarily (for the first period of time). Because the second human sensor 231 shifts to a non-detecting state during the delay, the power-saving mode is kept in the image processing apparatus 100.

FIG. 6E is a sequence diagram where the first sheet ejection sensor 232 detects a sheet and it is determined that a user is coming to the image processing apparatus 100 to acquire an output sheet and use the image processing apparatus. In the image processing apparatus 100, the second power supply unit 301 is fed if the first human sensor 230 detects a human. Next in the image processing apparatus 100, because the second human sensor 231 detects a human but the first sheet ejection sensor 232 is detecting a sheet, the feeding to the third power supply unit 302 is delayed temporarily (for the first period of time). Then, before the feeding by the third power supply unit 302 starts (before the end of the delay), because the first sheet ejection sensor 232 determines the "sheet absent state" but the second human sensor 231 is continuously detecting a human for a predetermined period of time (second period of time) or longer from the determination of the "sheet absent state", the third power supply unit 302 is fed, and the mode is shifted to the normal power mode in the image processing apparatus 100.

FIG. 6F is a sequence diagram where the first sheet ejection sensor 232 keeps its sheet detecting state for a predetermined period of time and the mode is shifted to the power-saving mode and it is determined that a user is approaching the image processing apparatus 100 to use it. In the normal power mode, if the first sheet ejection sensor 232 keeps its sheet-detecting state for a predetermined period of time (third period of time) or longer, the image processing apparatus 100 sets the ejection flag to "1". If the condition for a shift to the power-saving mode is satisfied, the image processing apparatus 100 is shifted to the power-saving mode 1. After that, in the image processing apparatus 100, if the first human sensor 230 detects a human, the second power supply unit 301 is fed, and the mode is shifted to the power-saving mode 2. Then, because the ejection flag has "1", the third power supply unit 302 is fed in the image processing apparatus 100 if the second human sensor 231 detects a human even though the first sheet ejection sensor 232 is detecting a sheet.

Thus, the use of two human sensors and sheet ejection sensor allows prevention of an unnecessary return from the power-saving mode by identifying a purpose intended by a user who is approaching the image processing apparatus 100 and detecting a human who is coming there to acquire a sheet ejected to the internal sheet ejecting unit, for example. This may reduce unnecessary power consumption and extend the life of a limited life component.

The configuration of the image processing apparatus 100 according to this embodiment is not limited to the configuration as illustrated in FIG. 4A and FIG. 4B but may only be required to implement power supply control as illustrated in FIG. 5 and FIGS. 6A to 6F.

Second Embodiment

A second embodiment will be described below with focus on differences from the first embodiment. According to the first embodiment, two human sensors and a sheet ejection sensor are used to control over output of a return instruction to a normal power mode from the first sheet ejection sensor 232 (or second human sensor 231) in order to prevent a unnecessary return from a power-saving mode. According to a second embodiment, instead of control over output of a return instruction, feeding to the second human sensor 231 is delayed for prevention of an unnecessary return from a power-saving mode. Differences from the first embodiment will be described.

Figure 7A:
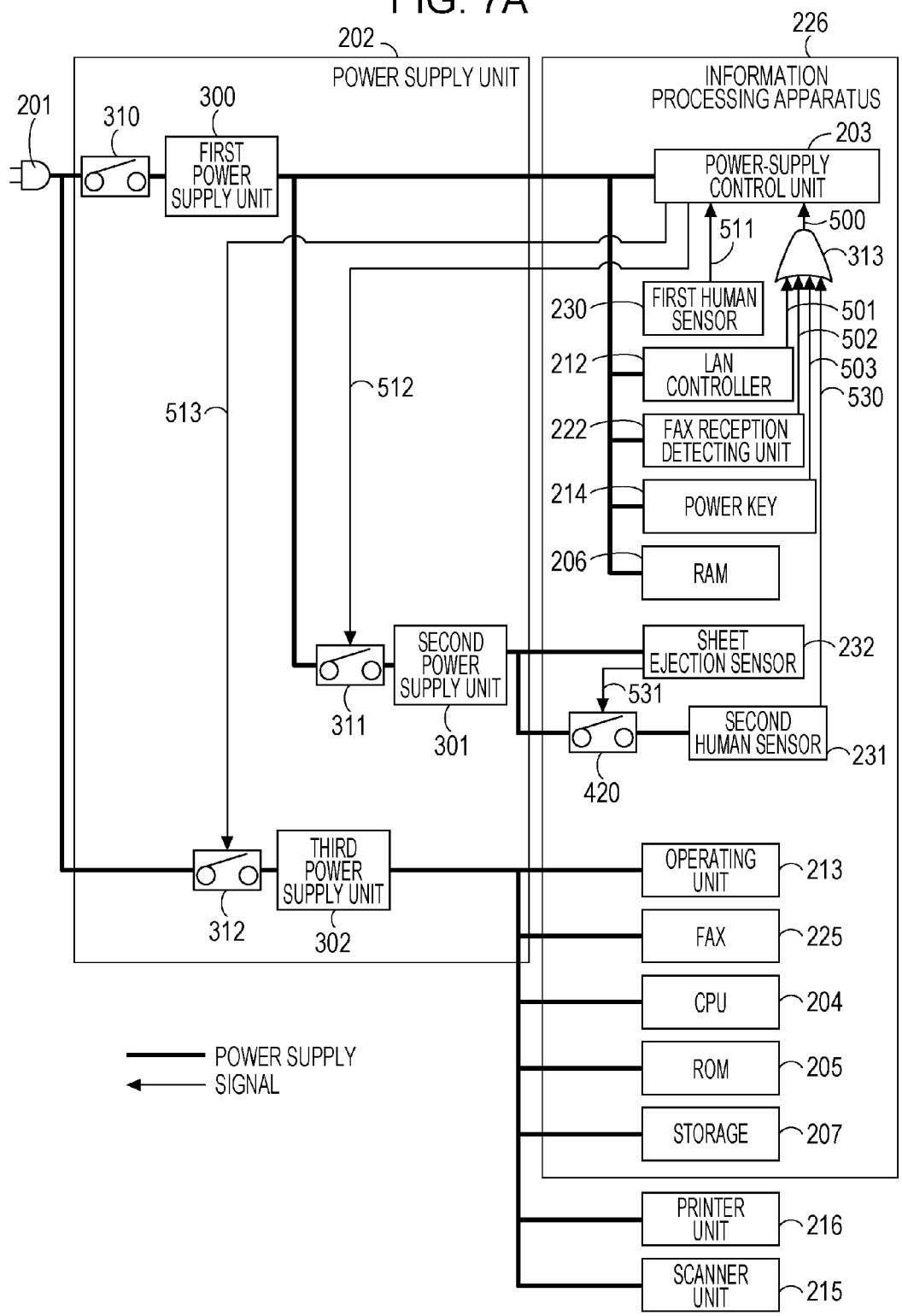
FIG. 7A is a block diagram illustrating an example of a power-feeding configuration of an image processing apparatus according to a second embodiment.

FIG. 7A is a block diagram illustrating an example of a power feeding configuration of an image processing apparatus 100 according to the second embodiment. Like numbers refer to like parts throughout. An SW 420 is a switch usable for turning on and off feeding to the second human sensor 231. If the SW 311 has an OFF state, the second human sensor 231 is not fed. If the SW 311 is turned on, power supplied from the second power supply unit 301 is fed to the second human sensor 231.

According to the second embodiment, the feeding to the second human sensor 231 is controlled on basis of a determination result from the first sheet ejection sensor 232. The feeding state is switched in accordance with the ON/OFF state of the SW 420. The SW 420 may be any device having a switchable feeding state, such as a relay and an FET.

The first sheet ejection sensor 232 that controls the feeding to the second human sensor 231 operates with the second power supply unit 301. The feeding to the second human sensor 231 is controlled by switching the feeding from the second power supply unit 301 to the second human sensor 231 through the SW 420.

In the power-saving mode 2, if it is determined that the first sheet ejection sensor 232 has a "sheet absent state", the first sheet ejection sensor 232 transmits to the SW 420 a signal 531 that turns on the SW 420. If it is determined that the first sheet ejection sensor 232 has a "sheet present state", the output of the ON signal 531 that turns on the SW 420 is temporarily delayed. A condition for the delay will be described below in detail with reference to FIG. 7B.

The second human sensor 231 is fed through the SW 420. If the second human sensor 231 detects a human, a request instruction 530 is transmitted from the second human sensor 231 to the logic 313. If the logic 313 receives at least one of request signals (501 to 504, 511, 530) that request a shift to the normal power mode, a shift request signal 500 is transmitted to the power-supply control unit 203. Thus, the image processing apparatus 100 is shifted to the normal power mode. The first sheet ejection sensor 232 and second human sensor 231 according to the second embodiment will be described in detail below.

Figure 7B:
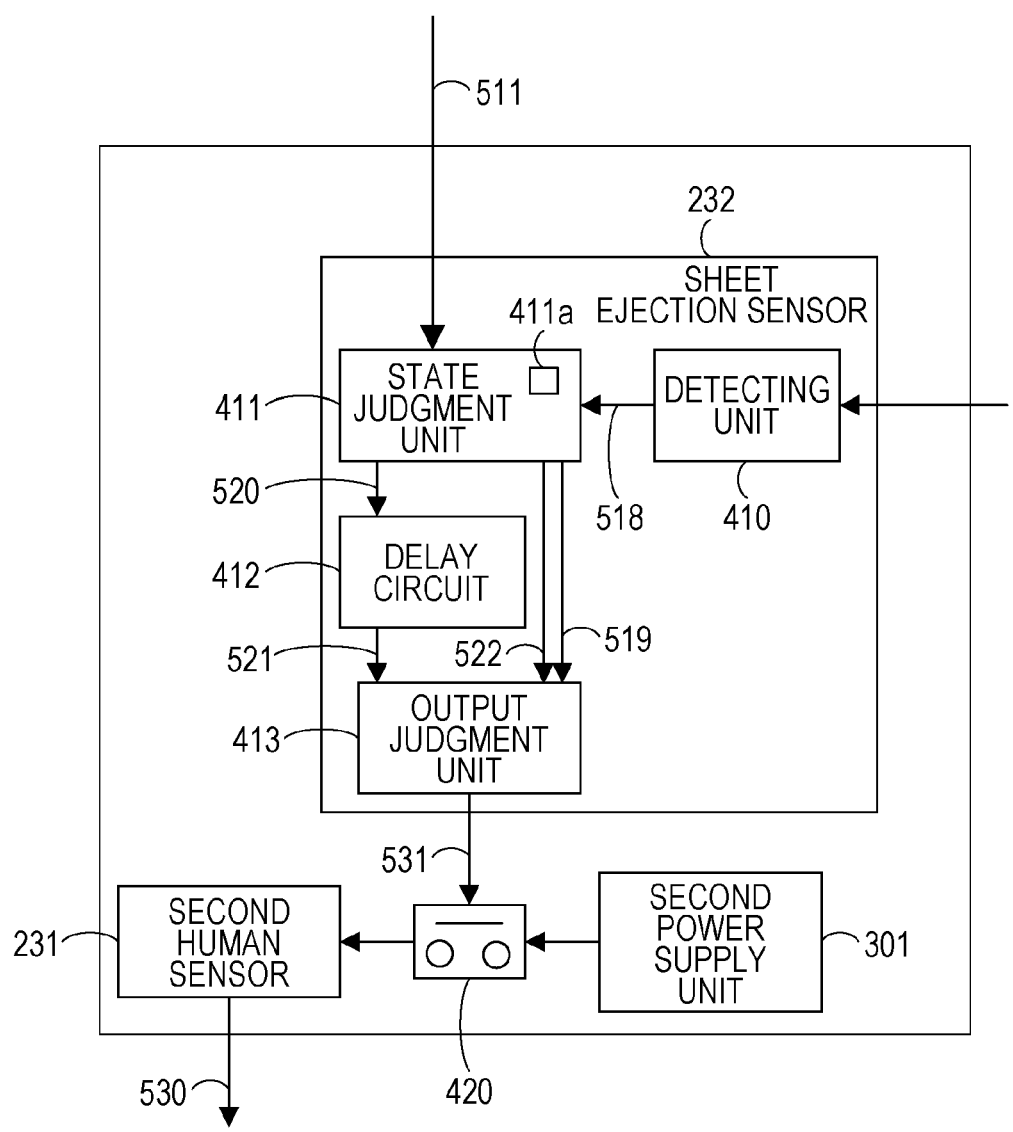
FIG. 7B is a detail block diagram regarding a sheet ejection sensor and a second human sensor according to the second embodiment.

FIG. 7B is a detail block diagram illustrating the first sheet ejection sensor 232 and second human sensor 231 according to the second embodiment. According to the second embodiment, as illustrated in FIG. 7B, the output signal 511 is input from the first human sensor 230 to the first sheet ejection sensor 232, though not illustrated in FIG. 7A.

A detecting unit 410 within the first sheet ejection sensor 232 outputs to a state judgment unit 411 a signal 518 indicative of the presence of a sheet on the internal finisher 103. The state judgment unit 411 controls feeding to the second human sensor 231 in accordance with the detected state from the detecting unit 410. This will be described more specifically below.

If the signal 518 has a Low state (that the detecting unit 410 does not detect a sheet), the state judgment unit 411 outputs to the output judgment unit 413 the signal 511 input from the first human sensor 230 as a signal 519. If the input signal 519 from the state judgment unit 411 has a High state, the output judgment unit 413 transmits an ON signal 531 to the SW 420.

Thus, if the detecting unit 410 does not detect a sheet upon shift to the power-saving mode 2, the feeding to the second human sensor 231 is started immediately after the shift to the power-saving mode 2. If the second human sensor 231 detects a human, the image processing apparatus 100 shifts to the normal power mode.

On the other hand, if the signal 518 has a High state (that the detecting unit 410 is detecting a sheet), the state judgment unit 411 outputs to a delay circuit 412 the signal 511 input from the first human sensor 230 as a signal 520. The delay circuit 412 delays the signal 520 input from the state judgment unit 411 by a predetermined period of time (such as a fourth period of time that is an assumed time sufficient for a human to acquire a sheet from the internal finisher 103 and leave from a detection range 112 (FIG. 2) of the first human sensor 230 from a detection of the second human sensor 231) and outputs it as a signal 521 to the output judgment unit 413. If the output judgment unit 413 judges that the input signal 521 from the delay circuit 412 has a High state, the output judgment unit 413 transmits an ON signal 531 to the SW 420.

Thus, if the detecting unit 410 detects a sheet upon shift to the power-saving mode 2, the feeding to the second human sensor 231 is started with a delay of a predetermined period of time (fourth period of time) from the shift to the power-saving mode 2.

If the signal 518 from the detecting unit 410 changes from a detecting state (High) to a non-detecting state (Low) while the feeding to the second human sensor 231 is being delayed, the state judgment unit 411 shifts a disable signal 522 to a High state and outputs it to the output judgment unit 413. The state judgment unit 411 holds the disable signal 522 at a High state for a predetermined period of time (at least, fourth period of time). If the disable signal 522 has a High state, the output judgment unit 413 does not output a request instruction 530 even when the delay signal 521 is shifted to a High state. The state judgment unit 411 does not output the signal 519 and signal 520 for a predetermined period of time (such as the second period of time). In other words, the feeding to the second human sensor 231 is not started for at least the second period of time. If the first human sensor 230 no longer detects a human even while the state judgment unit 411 is holding the disable signal 522 at a High state, the image processing apparatus 100 shifts to the power-saving mode 1.

If the signal 518 keeps a High state (that the detecting unit 410 is detecting a sheet) for a predetermined period of time (third period of time) or longer in the normal power mode, the state judgment unit 411 stores "1" as an ejection flag at the register 411a within the state judgment unit 411. If the ejection flag is "1" in the power-saving mode, the state judgment unit 411 outputs the signal 519 having a High state, irrespective of the signal 518. If a sheet is left on the internal finisher 103 for a predetermined period of time (third period of time) or longer, the second human sensor 231 is fed irrespective of the detecting state of the detecting unit 410.

Thus, the output judgment unit 413 outputs a signal to the SW 420 that switches the feeding state to the second human sensor 231 on basis of a result of the state judgment unit 411 and a result of the delay circuit 412. The second human sensor 231 is fed from the second power supply unit 301 through the SW 420 to operate.

FIG. 8 is a flowchart illustrating an example of a sensor power supply control in the image processing apparatus 100 according to the second embodiment. Differences from the first embodiment (FIG. 5) will be described below. The image processing apparatus 100 performs processing in steps S12 to S15 if the normal power mode is not shifted to the power-saving mode (No in S11), that is, in the normal power mode. Because the same processing is performed in steps S12 to S15 as that in the steps in FIG. 5, the description will be omitted.

If the normal power mode is shifted to the power-saving mode (Yes in S11), that is, in the power-saving mode, the image processing apparatus 100 performs processing in step S16 and subsequent steps. Because the same processing is performed in steps S16 to S18 as that in the steps in FIG. 5, the description will be omitted.

According to the second embodiment, when the feeding to the second power supply unit 301 starts, the feeding to the first sheet ejection sensor 232 starts to activate it. If it is determined that the ejection flag has "1" (Yes in S20), the first sheet ejection sensor 232 outputs the ON signal 531 and starts the feeding to the second human sensor 231 (S30). More specifically, the state judgment unit 411 outputs the output signal 519 having a High state to the output judgment unit 403, and the output judgment unit 403 outputs the ON signal 531. This turns on the SW 420, and the feeding to the second human sensor 231 is started.

On the other hand, if it is determined that the ejection flag is not "1" (No in S20), the first sheet ejection sensor 232 performs control on basis of whether the detecting unit 410 has detected a sheet on the internal finisher 103 (sheet present state) or not (sheet absent state).

If the "sheet present state" is determined (Yes in S21), the first sheet ejection sensor 232 controls to delay the feeding to the second human sensor 231. More specifically, the state judgment unit 411 outputs the output signal 520 having a High state to the delay circuit 412. The state judgment unit 411 further determines whether the "sheet present state" has been kept for a predetermined period of time (or the delay time (fourth period of time) given by the delay circuit 412) (S22).

If it is determined that the "sheet present state" has not been kept for the predetermined period of time (No in S22), the first sheet ejection sensor 232 (or state judgment unit 401 more specifically) returns the processing to step S22 and keeps trying to detect the elapse of the predetermined period of time. The image processing apparatus 100 as a whole returns the processing to step S16.

If a change in the ejection state (Yes in S31) is determined, that is, if it is determined that the ejection state has changed from the "sheet present state" to the "sheet absent state" during the elapse of the predetermined period of time (No in S21), the image processing apparatus 100 determines that an approaching human is coming to acquire a printed material. Then, the determination of the elapse of the predetermined period of time (fourth period of time) is stopped, and the power-saving mode is kept for a predetermined period of time (second period of time) (S32). Then, the processing is returned to S16. More specifically, the state judgment unit 411 transmits a disable signal 522 (having a High state) to the output judgment unit 413 for a predetermined period of time (fourth period of time) to control not to output the signals 519 and 520 for a predetermined period of time (second period of time). Even while the state judgment unit 411 is holding the disable signal 522 at a High state, if the first human sensor 230 no longer detects a human, the image processing apparatus 100 shifts to the power-saving mode 1, though not illustrated. Thus, the power-saving mode 1 or 2 is kept for a predetermined period of time (or the second period of time). The image processing apparatus 100 as a whole performs the processing in step S16 and subsequent steps.

If no change in the ejection state (No in S31) is determined, with the "sheet absent state" (No in S21), for example, if the "sheet absent state" is determined immediately after a shift to the power-saving mode 2 or immediately after keeping the power-saving mode in step S32, the ON signal 531 is output to start feeding to the second human sensor 231 (S30).

If the second human sensor 231 the feeding to which has been started does not detect a human (No in S19), the image processing apparatus 100 returns the processing to S16. On the other hand, if the second human sensor 231 detects a human (Yes in S19), the request instruction 530 is transmitted from the second human sensor 231 to the logic 313 to shift to the normal power mode (S23).

FIGS. 9A to 9F are sequence diagrams showing examples of power supply states of the image processing apparatus 100 and detection states of the sensors according to the second embodiment. FIG. 9A is a sequence diagram where the first sheet ejection sensor 232 does not detect a sheet. In the image processing apparatus 100, the second power supply unit 301 is fed if the first human sensor 230 detects a human. Next, in the image processing apparatus 100, the second human sensor 231 is fed because the first sheet ejection sensor 232 does not detect a sheet. Further in the image processing apparatus 100, the third power supply unit 302 is fed if the second human sensor 231 detects a human.

FIG. 9B is a sequence diagram where the first sheet ejection sensor 232 detects a sheet and it is determined that a user is approaching to use the image processing apparatus 100. In the image processing apparatus 100, the second power supply unit 301 is fed if the first human sensor 230 detects a human. Next in the image processing apparatus 100, because the first sheet ejection sensor 232 detects a sheet, the feeding to the second human sensor 231 is delayed temporarily (for the fourth period of time). Further in the image processing apparatus 100, because the first sheet ejection sensor 232 still detects a sheet and the first human sensor 230 is continuously detecting a human, the second human sensor 231 is fed. Further in image processing apparatus 100, because the second human sensor 231 is detecting a human, the third power supply unit 302 is fed, and the mode is shifted to the normal power mode.

FIG. 9C is a sequence diagram where the first sheet ejection sensor 232 detects a sheet and it is determined that a user is coming to the image processing apparatus 100 to acquire an output sheet. In the image processing apparatus 100, the second power supply unit 301 is fed if the first human sensor 230 detects a human. Next in the image processing apparatus 100, because the first sheet ejection sensor 232 is detecting a sheet, the feeding to the second human sensor 231 is delayed temporarily (for the fourth period of time). Then, because the first sheet ejection sensor 232 determines the "sheet absent state" before the feeding to the third power supply unit 302 is started, the image processing apparatus 100 does not feed to the second human sensor 231 for a predetermined period of time (second period of time). Because the first human sensor 230 shifts to a non-detecting state during the delay, the image processing apparatus 100 is shifted to the power-saving mode 1.

FIG. 9D is a sequence diagram where the first sheet ejection sensor 232 detects a sheet, and a sheet is output by a plurality of user, and it is determined that one of the human users is coming to the image processing apparatus 100 to acquire the output sheet. In the image processing apparatus 100, if the first human sensor 230 detects a human, the second power supply unit 301 is fed. Next, in the image processing apparatus 100, because the first sheet ejection sensor 232 is detecting a sheet, the feeding to the second human sensor 231 is delayed temporarily (for the fourth period of time). Because the first human sensor 230 shifts to a non-detecting state during the delay, the mode is shifted to the power-saving mode in the image processing apparatus 100.

FIG. 9E is a sequence diagram where the first sheet ejection sensor 232 detects a sheet and it is determined that a user is coming to the image processing apparatus 100 to acquire an output sheet and use the image processing apparatus 100. In the image processing apparatus 100, the second power supply unit 301 is fed if the first human sensor 230 detects a human. Next in the image processing apparatus 100, because the first sheet ejection sensor 232 is detecting a sheet, the feeding to the second human sensor 231 is delayed temporarily for a predetermined period of time (for the fourth period of time). Then, before the feeding by the third power supply unit 302 starts because the first sheet ejection sensor 232 determines the "sheet absent state" but the second human sensor 231 is continuously detecting a human for a predetermined period of time (second period of time) or longer after that, the second human sensor 231 is fed. Then, in the image processing apparatus 100, because the second human sensor 231 is detecting a human, the third power supply unit 302 is fed, and the mode is shifted to the normal power mode.

FIG. 9F is a sequence diagram where the first sheet ejection sensor 232 keeps its sheet detecting state for a predetermined period of time and the mode is shifted to the power-saving mode and it is determined that a user is approaching the image processing apparatus 100 to use it. In the normal power mode, if the first sheet ejection sensor 232 keeps its sheet detecting state for a predetermined period of time (third period of time) or longer, the image processing apparatus 100 sets the ejection flag to "1". If the condition for a shift to the power-saving mode is satisfied, the image processing apparatus 100 is shifted to the power-saving mode 1. After that, if the first human sensor 230 detects a human, the second power supply unit 301 is fed, and the image processing apparatus 100 is shifted to the power-saving mode 2. Then, the image processing apparatus 100 feeds to the third power supply unit 302 if the second human sensor 231 detects a human even though the first sheet ejection sensor 232 detects a sheet. Then, because the ejection flag is "1", the third power supply unit 302 is fed if the second human sensor 231 detects a human even though the first sheet ejection sensor 232 is detecting a sheet, and the mode is shifted to the normal power mode.

Thus, the use of the two human sensors and sheet ejection sensor allows prevention of an unnecessary return from the power-saving mode by identifying a purpose intended by a user who is approaching the image processing apparatus 100, detecting a human who is coming there to acquire a sheet ejected to the internal sheet ejecting unit, for example, and delaying the feeding to the second human sensor 231. This may reduce unnecessary power consumption and extend the life of a limited life component.

The configuration of the image processing apparatus 100 according to this embodiment is not limited to the configuration as illustrated in FIG. 7A and FIG. 7B but may only be required to implement power supply control as illustrated in FIG. 8 and FIGS. 9A to 9F.

Third Embodiment

A third embodiment will be described below with focus on differences from the first embodiment. According to the first embodiment, two human sensors and a sheet ejection sensor are used to control over output of a return instruction to a normal power mode from the first sheet ejection sensor 232 (or second human sensor 231) in order to prevent a unnecessary return from a power-saving mode. According to the third embodiment, instead of control over output of a return instruction, two sheet ejection sensors are used to restrict an unnecessary return from a power-saving mode in accordance with a detection state of the second sheet ejection sensor 233 while a return is being delayed in accordance with a detection state of the first sheet ejection sensor 232. This configuration allows precise identification of a purpose of a human approaching the image processing apparatus 100 for more convenience. Differences from the first embodiment will be described.

Figure 10A:
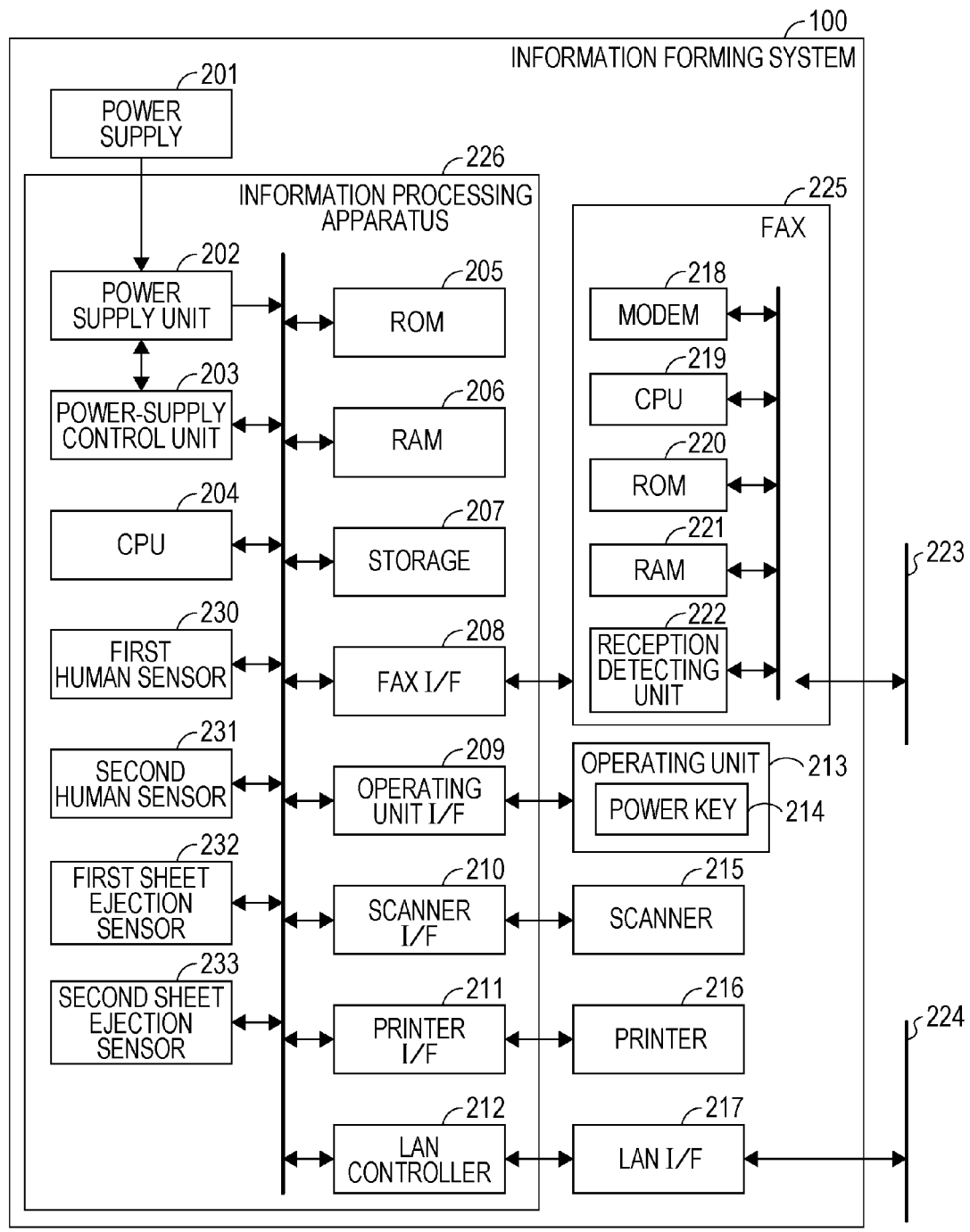
FIGS. 10A to 10C are block diagrams illustrating an example of a hardware configuration of an image processing apparatus according to a third embodiment.
Figure 10B:
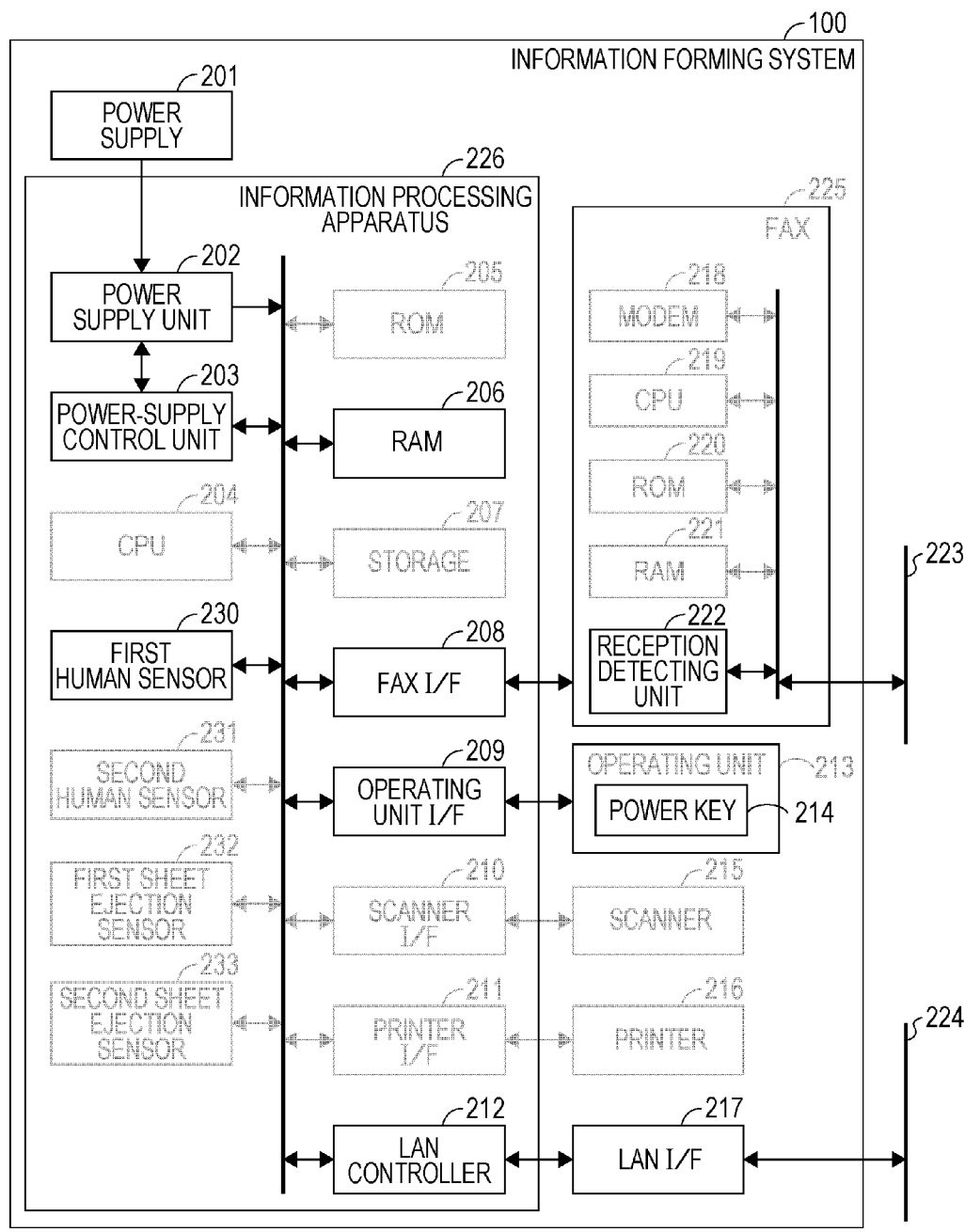
Figure 10C:
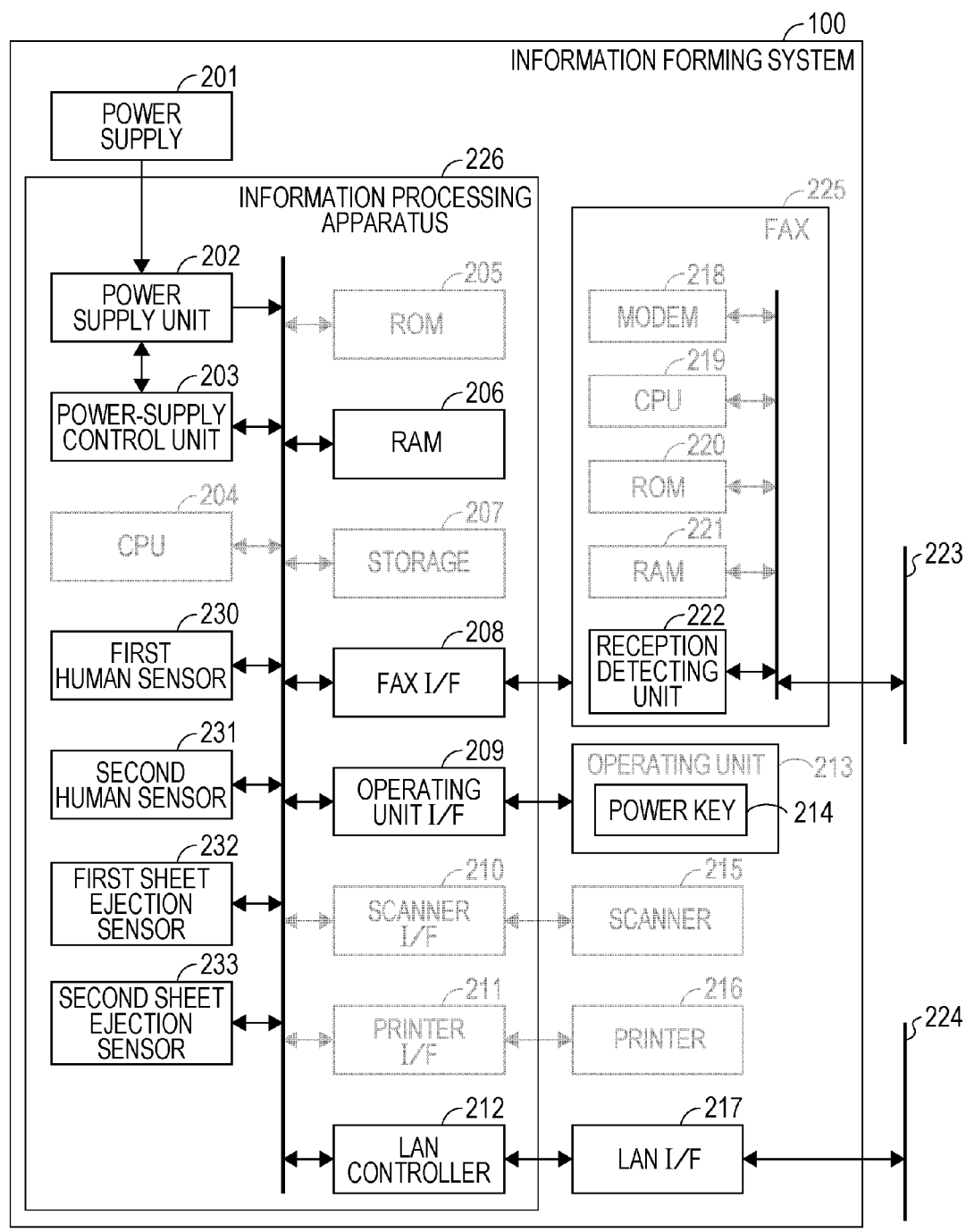

FIGS. 10A to 10C are block diagrams illustrating examples of hardware configurations of the image processing apparatus 100 according to the third embodiment. It is different from the first and second embodiments in that the second sheet ejection sensor 233 is included in the configuration.

In the "normal power mode", power is supplied to all blocks illustrated in FIG. 10A. In the "power-saving mode 1", the blocks faded in FIG. 10B are not fed. In the "power-saving mode 2", block faded in FIG. 10C is not fed. The second sheet ejection sensor 233 is fed in the normal power mode and the power-saving mode 2.

Figure 11A:
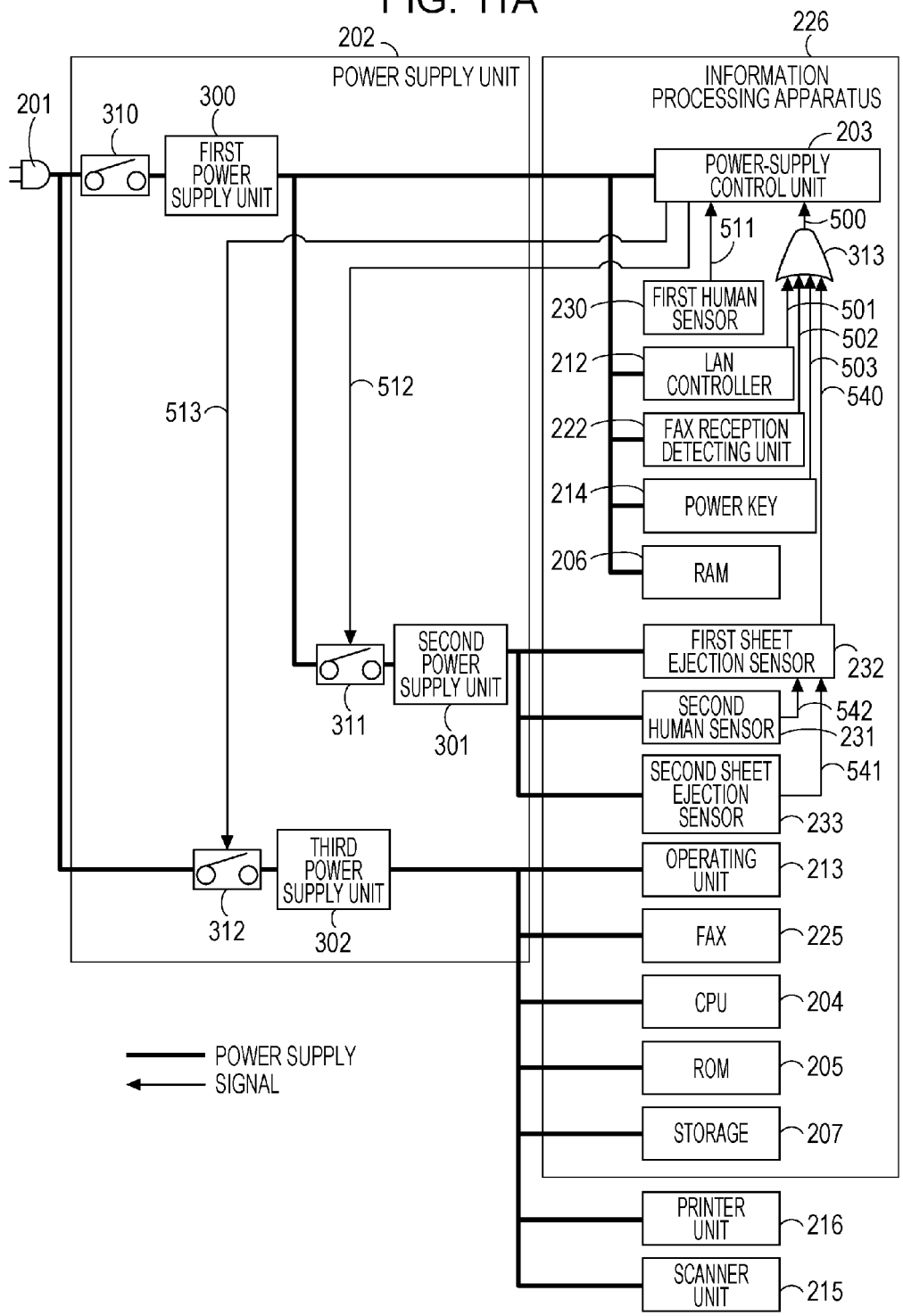
FIG. 11A is a block diagram illustrating an example of a power-feeding configuration of an image processing apparatus according to a third embodiment.

Shifts of the power modes using sensors according to the third embodiment will be described in detail with reference to FIGS. 11A and 11B. FIG. 11A is a block diagram illustrating an example of a feeding configuration in the image processing apparatus 100 according to the third embodiment. Like numbers refer to like parts throughout.

According to the third embodiment, the feeding mode is switched in accordance with determination results from the first sheet ejection sensor 232, second sheet ejection sensor 233, and second human sensor 231. The second human sensor 231, first sheet ejection sensor 232, and second sheet ejection sensor 233 are fed from the second power supply unit 301.

The first sheet ejection sensor 232 transmits a request signal 540 that turns on the SW 312 to the logic 313 if a detection result from the first sheet ejection sensor 232 is a "sheet absent state" and if the second human sensor 231 is detecting a human. The first sheet ejection sensor 232 delays the output of the request signal 540 that turns on the SW 311 if a detection result from the first sheet ejection sensor 232 is a "sheet present state".

If the second sheet ejection sensor 233 detects a hand acquiring a sheet during the delay of the output of the request signal 540, the first sheet ejection sensor 232 disables the delayed output of the request signal 540. A condition for delaying or disabling the request signal 540 that turns on the logic 313 will be described below with reference to FIG. 11B.

A detection result from the second sheet ejection sensor 233 is transmitted to the first sheet ejection sensor 232 through a signal 541. A detection result from the second human sensor 231 is transmitted to the first sheet ejection sensor 232 through a signal 542.

Figure 11B:
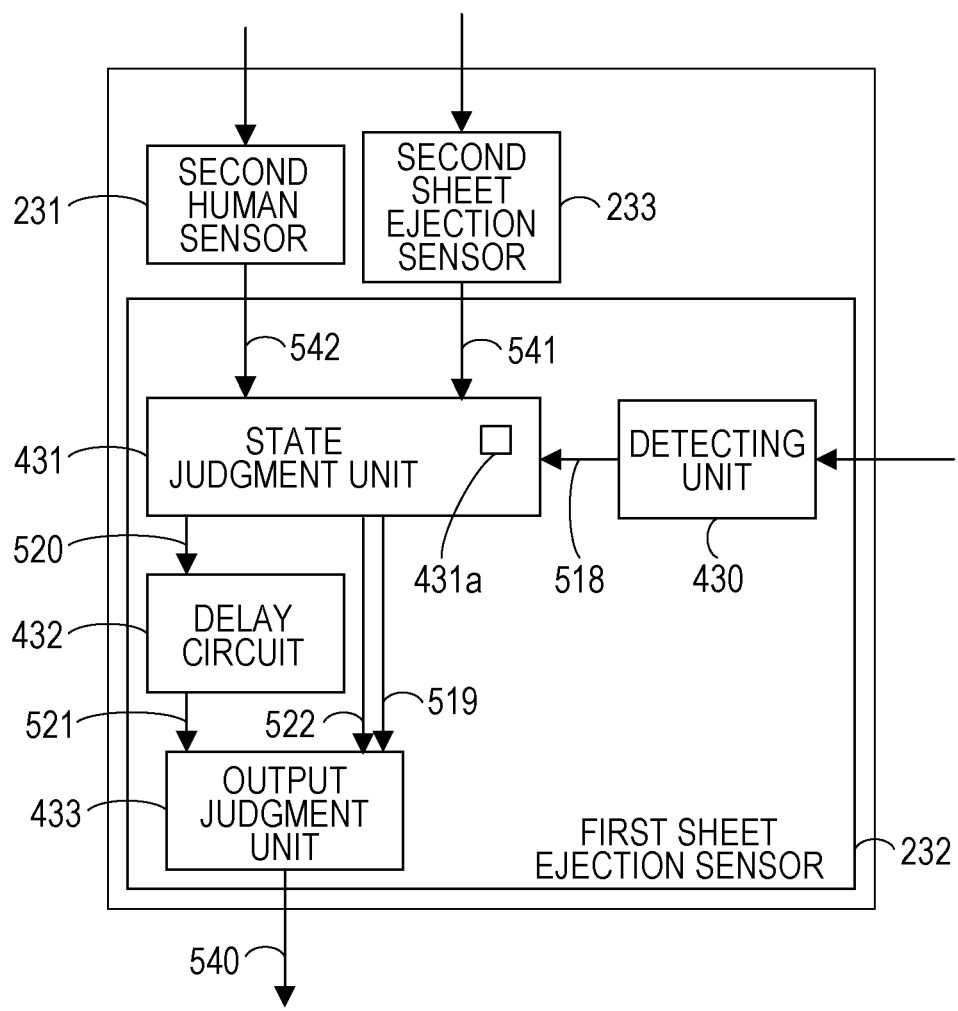
FIG. 11B is a detail block diagram regarding a first sheet ejection sensor, a second human sensor, and a second sheet ejection sensor according to the third embodiment.

FIG. 11B is a detail block diagram illustrating the first sheet ejection sensor 232, second human sensor 231, and second sheet ejection sensor 233 according to the third embodiment. A detecting unit 430 within the first sheet ejection sensor 232 outputs to a state judgment unit 431*a* signal 518 indicative of the presence of a sheet on the internal finisher 103. The state judgment unit 431 outputs a signal to the delay circuit 412 or output judgment unit 413 on basis of a signal from the detecting unit 430, second sheet ejection sensor 233, and second human sensor 231. This will be described more specifically below.

If the signal 518 has a Low state (or if the detecting unit 430 does not detect a sheet), the state judgment unit 431 outputs to the output judgment unit 403 the signal 542 input from the second human sensor 231 as a signal 519. If the input signal 519 from the state judgment unit 431 has a High state (second human sensor 231 is detecting a human), the output judgment unit 433 transmits a request instruction 540 to the logic 313. Thus, an ON instruction 513 is transmitted from the power-supply control unit 203 to the SW 312, and the third power supply unit 302 is fed. The image processing apparatus 100 is shifted to the normal power mode.

On the other hand, if the signal 518 has a High state (that the detecting unit 430 is detecting a sheet), the state judgment unit 431 outputs to a delay circuit 432 the signal 542 input from the second human sensor 231 as a signal 520. The delay circuit 432 delays the signal 520 input from the state judgment unit 431 by a predetermined period of time (such as a fifth period of time that is an assumed time sufficient for a human to be detected by the second human sensor 231 and insert his/her hand to a detection range 110 (FIG. 2) of the second sheet ejection sensor 233) and outputs it as a signal 521 to the output judgment unit 433. If the output judgment unit 433 judges that the input signal 521 from the delay circuit 432 has a High state (that the second human sensor 231 is detecting a human), the output judgment unit 433 transmits a request instruction 540 to the logic 313. Thus, the ON instruction 513 is transmitted from the power-supply control unit 203 to the SW 312 with a delay of a predetermined period of time (fifth period of time) from a detection of a human by the second human sensor 231, and the third power supply unit 302 is fed. Then, the image processing apparatus 100 is shifted to the normal power mode.

If the signal 518 from the detecting unit 430 changes from a detecting state to a non-detecting state (from a High state to a Low state) while the feeding to the third power supply unit 302 is being delayed (during the elapse of the fifth period of time) or if the second sheet ejection sensor 233 detects a hand (the signal 541 comes to have a High state), the state judgment unit 431 shifts the disable signal 522 that disables the delay signal 521 from the delay circuit 432 to a High state and transmits it to the output judgment unit 433. If the disable signal 522 has a High state, the output judgment unit 433 does not output a request instruction 540 even when the delay signal 521 is shifted to a High state. The state judgment unit 431 holds the disable signal 522 at a High state for a predetermined period of time (at least the fifth period of time). The state judgment unit 401 does not output the signals 519 and 520 for a predetermined period of time (such as a sixth period of time that is an assumed time sufficient from a detection of a human hand by the second sheet ejection sensor 233 until the human acquires a sheet and leaves the detection range 112 (FIG. 2) of the second human sensor 231). In other words, the power-saving mode is kept for the predetermined period of time (sixth period of time). If the first human sensor 230 no longer detects a human while the state judgment unit 431 is holding the disable signal 522 at a High state, the image processing apparatus 100 shifts to the power-saving mode 1.

If the signal 542 from the second human sensor 231 changes from a detecting state (High) to a non-detecting state (Low) while the feeding to the third power supply unit 302 is being delayed (during the elapse of the first period of time), the state judgment unit 431 transmits the disable signal 522 to the output judgment unit 413. The state judgment unit 431 holds the disable signal 522 at a High state for a predetermined period of time (at least the first period of time).

If the signal 518 keeps a High state (that the detecting unit 430 is detecting a sheet) for a predetermined period of time (third period of time) or longer in the normal power mode, the state judgment unit 431 stores "1" as an ejection flag at the register 431*a* within the state judgment unit 431. If the ejection flag is "1" in the power-saving mode, the state judgment unit 431 outputs to the output judgment unit 433 the signal 515 input from the second human sensor 231 as the signal 519, irrespective of the signal 518. If a sheet is left on the internal finisher 103 for a predetermined period of time (third period of time) or longer and if the second human sensor 231 detects a human, the mode is shifted to the normal power mode, irrespective of the detection state of the detecting unit 430.

Figure 12:
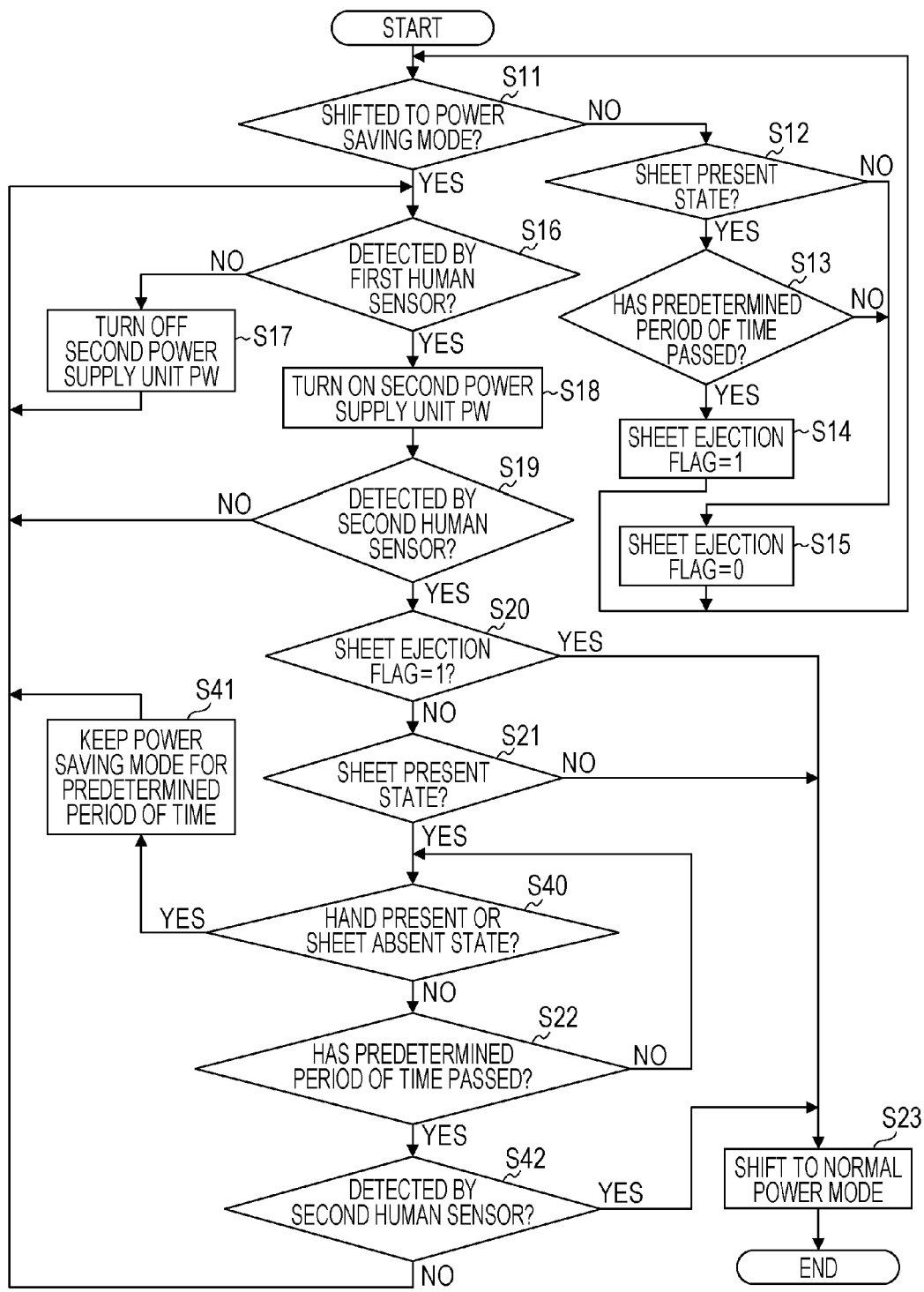
FIG. 12 is a flowchart illustrating an example of sensor power supply control over the image processing apparatus according to a third embodiment.

FIG. 12 is a flowchart illustrating an example of a sensor power supply control in the image processing apparatus 100 according to the third embodiment. Differences from the first embodiment (FIG. 5) will be described below. The image processing apparatus 100 performs processing in steps S12 to S15 if the normal power mode is not shifted to the power-saving mode (No in S11), that is, in the normal power mode. Because the same processing is performed in steps S12 to S15 as that in the steps in FIG. 5, the description will be omitted.

If the normal power mode is shifted to the power-saving mode (Yes in S11), that is, in the power-saving mode, the image processing apparatus 100 performs processing in step S16 and subsequent steps. Because the same processing is performed in steps S16 to S21 as that in the steps in FIG. 5, the description will be omitted.

The first sheet ejection sensor 232 performs control on basis of whether the detecting unit 430 has detected a sheet on the internal finisher 103 (sheet present state) or not (sheet absent state). If the first sheet ejection sensor 232 determines that the detecting unit 430 is detecting a sheet on the internal finisher 103 (sheet present state) (Yes in S21), the first sheet ejection sensor 232 controls to delay a shift to the normal power mode. More specifically, the state judgment unit 431 outputs to the delay circuit 432 the input signal 515 from the second human sensor 231 as an output signal 520. The state judgment unit 431 further determines whether a predetermined period of time (the delay time (fifth period of time) by the delay circuit 432) has passed or not where the second sheet ejection sensor 233 is not detecting a hand (hand absent state) with the "sheet present state" (S40, S22).

If it is determined that the predetermined period of time has passed with the "hand absent state" and "sheet present state" (No in S40 and Yes in S22), the processing moves to step S42. In S42, if the first sheet ejection sensor 232 determines that the second human sensor 231 is detecting a human (Yes in S42), the request instruction 540 is output, and the mode is shifted to the normal power mode (S23). More specifically, the output signal 521 having a High state is output from the delay circuit 432 to the output judgment unit 403, and the output judgment unit 433 outputs a request instruction 540. Thus, the mode is shifted to the normal power mode.

On the other hand, if the second human sensor 231 does not detect a human (No in S42), the image processing apparatus 100 returns the processing to step S16. If the "hand present state" is detected or the "sheet absent state" is detected before the elapse of a predetermined period of time (Yes in S40), the image processing apparatus 100 determines that a human is approaching to acquire a printed material and keeps the power-saving mode 1 or 2 for a predetermined period of time (sixth period of time here) (S41) and moves the processing to step S16. This is for the purpose of preventing an unnecessary shift to the normal power mode when the processing is moved to step S16 immediately after a hand is detected and the "sheet present state" is determined in step S21.

More specifically, the state judgment unit 431 transmits a disable signal 522 (having a High state) to the delay circuit 432 for at least the fifth period of time to control not to output the signals 519 and 520 for a predetermined period of time (sixth period of time). Even while the state judgment unit 431 is holding the disable signal 522 at a High state, if the first human sensor 230 no longer detects a human, the image processing apparatus 100 shifts to the power-saving mode 1, though not illustrated. Thus, the power-saving mode 1 or 2 is kept for a predetermined period of time (or the sixth period of time). The image processing apparatus 100 as a whole performs the processing in step S16 and subsequent steps.

FIGS. 13A to 13E are sequence diagrams showing examples of power supply states of the image processing apparatus 100 and detection states of the sensors according to the third embodiment. FIG. 13A is a sequence diagram where the first sheet ejection sensor 232 does not detect a sheet. In the image processing apparatus 100, the second power supply unit 301 is fed if the first human sensor 230 detects a human. Next, in the image processing apparatus 100, the third power supply unit 302 is fed because the first sheet ejection sensor 232 does not detect a sheet and the second human sensor 231 detects a human. Thus, the mode is shifted to the normal power mode.

FIG. 13B is a sequence diagram where the first sheet ejection sensor 232 detects a sheet and it is determined that a user is approaching to use the image processing apparatus 100. In the image processing apparatus 100, the second power supply unit 301 is fed if the first human sensor 230 detects a human. Next in the image processing apparatus 100, because the first sheet ejection sensor 232 detects a sheet and the second human sensor 231 detects a human, the feeding to the third power supply unit 302 is delayed temporarily (for the fifth period of time). Then, in the image processing apparatus 100, because the second sheet ejection sensor 233 is not detecting a user's hand acquiring a sheet until the feeding to the third power supply unit 302 starts, the third power supply unit 302 is fed and the normal power mode is kept.

FIG. 13C is a sequence diagram where the first sheet ejection sensor 232 detects a sheet and it is determined that a user is approaching the image processing apparatus 100 to acquire a printed material. In the image processing apparatus 100, the second power supply unit 301 is fed if the first human sensor 230 detects a human. Next in the image processing apparatus 100, because the first sheet ejection sensor 232 is detecting a sheet and the second human sensor 231 detects a human, the feeding to the third power supply unit 302 is delayed temporarily (for the fifth period of time). Further, because the second sheet ejection sensor 233 detects a hand acquiring a sheet before the feeding to the third power supply unit 302 is started, the image processing apparatus 100 disables the feeding to the third power supply unit 302, and the power-saving mode is kept.

FIG. 13D is a sequence diagram where the first sheet ejection sensor 232 detects a sheet, and it is determined that a user is coming to the image processing apparatus 100 to acquire the output sheet and use the image processing apparatus 100. In the image processing apparatus 100, if the first human sensor 230 detects a human, the second power supply unit 301 is fed. Next, in the image processing apparatus 100, because the second human sensor 231 detects a human but the first sheet ejection sensor 232 is detecting a sheet, the feeding to the third power supply unit 302 is delayed temporarily (for the fifth period of time). Because the second sheet ejection sensor 233 detects a hand acquiring a sheet before the feeding to the third power supply unit 302 starts, the power-saving mode is kept for a predetermined period of time (sixth period of time) in the image processing apparatus 100. Then, in the image processing apparatus 100, because the state that the second human sensor 231 is detecting a human is kept while the power saving mode is being kept, it is determined that the image processing apparatus 100 is to be used. Thus, the third power supply unit 302 is fed, and the mode is shifted to the normal power mode.

FIG. 13E is a sequence diagram where the first sheet ejection sensor 232 keeps its sheet detecting state for a predetermined period of time and the mode is shifted to the power-saving mode and it is determined that a user is approaching the image processing apparatus 100 to use it. If the first sheet ejection sensor 232 keeps its sheet detecting state for a predetermined period of time (third period of time) or longer, the image processing apparatus 100 sets the ejection flag to "1". If the condition for a shift to the power-saving mode is satisfied, the image processing apparatus 100 is shifted to the power-saving mode 1. After that, if the first human sensor 230 detects a human, the second power supply unit 301 is fed, and the image processing apparatus 100 is shifted to the power-saving mode 2. Then, because the ejection flag is "1", the third power supply unit 302 is fed if the second human sensor 231 detects a human, and the image processing apparatus 100 is shifted to the normal power mode.

Thus, the use of the two human sensors and two sheet ejection sensor allows prevention of an unnecessary return from the power-saving mode by more precisely and quickly identifying a purpose intended by a user who is approaching the image processing apparatus 100, and more securely detecting a human who is coming there to acquire a sheet ejected to the internal sheet ejecting unit, for example. This may reduce unnecessary power consumption and extend the life of a limited life component.

The configuration of the image processing apparatus 100 according to this embodiment is not limited to the configuration as illustrated in FIG. 11A and FIG. 11B but may only be required to implement power supply control as illustrated in FIG. 12 and FIGS. 13A to 13E.

Fourth Embodiment

A fourth embodiment will be described below with focus on differences from the third embodiment. According to the third embodiment, two sheet ejection sensors are used to restrict an unnecessary return from a power-saving mode in accordance with a detection state of the second sheet ejection sensor 233 while a return is being delayed in accordance with a detection state of the first sheet ejection sensor 232. According to the fourth embodiment, the feeding to the second sheet ejection sensor 233 is switched in accordance with a detection state of the first sheet ejection sensor 232 to allow control over output of a return instruction for higher power saving. This configuration allows precise identification of a purpose of a human approaching the image processing apparatus 100 for higher power saving. Differences from the third embodiment will be described.

Figure 14A:
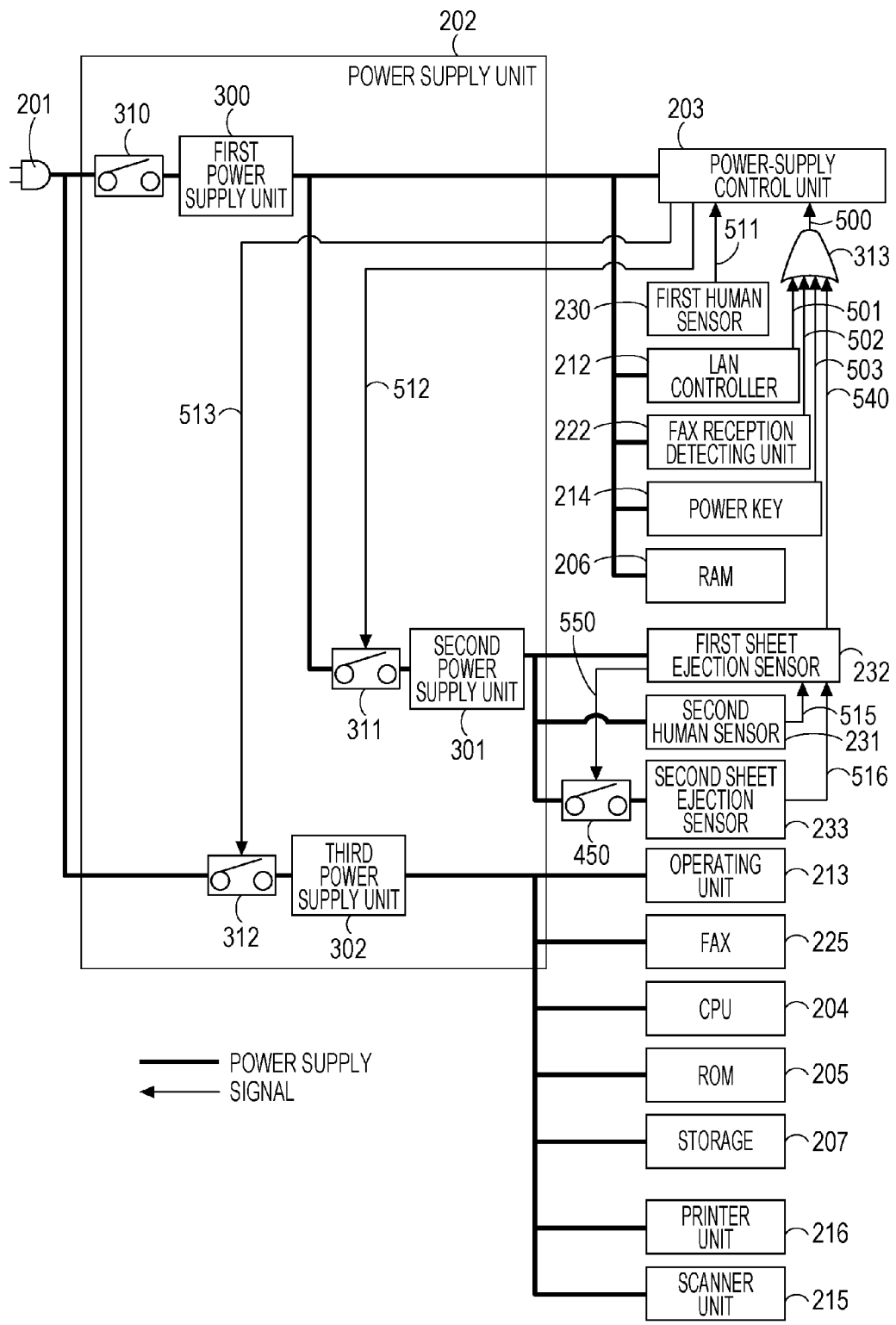
FIG. 14A is a block diagram illustrating an example of a power-feeding configuration of an image processing apparatus according to a fourth embodiment.

Shifts of the power modes using sensors according to the fourth embodiment will be described in detail with reference to FIGS. 14A and 14B. FIG. 14A is a block diagram illustrating an example of a feeding configuration in the image processing apparatus 100 according to the fourth embodiment. Like numbers refer to like parts throughout. According to the fourth embodiment, an ON/OFF signal 550 is transmitted to an SW 450 in accordance with a detection state of the first sheet ejection sensor 232 to switch the feeding state to the second sheet ejection sensor 233. The SW 450 may be any device having a switchable feeding state, such as a relay and an FET. The second human sensor 231, first sheet ejection sensor 232, and second sheet ejection sensor 233 are fed from the second power supply unit 301.

Figure 14B:
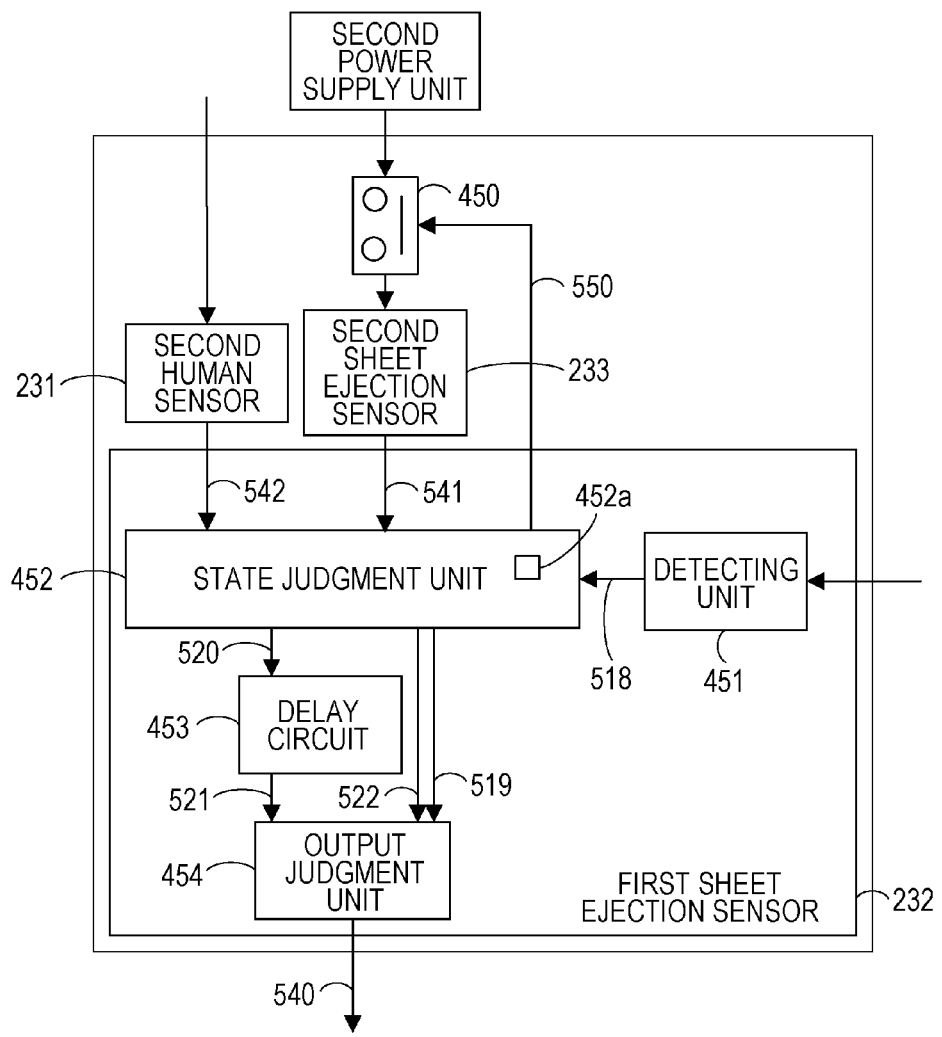
FIG. 14B is a detail block diagram regarding a first sheet ejection sensor, a second human sensor, and a second sheet ejection sensor according to a fourth embodiment.

FIG. 14B is a detail block diagram illustrating the first sheet ejection sensor 232, second human sensor 231, and second sheet ejection sensor 233 according to the fourth embodiment. A detecting unit 451 within the first sheet ejection sensor 232 outputs to a state judgment unit 452 a signal 518 indicative of the presence of a sheet within the internal finisher 103.

The state judgment unit 452 determines a sheet detection state of the detecting unit 451 and allows feeding to the second sheet ejection sensor 233 if the detecting unit 451 is not detecting a sheet. On the other hand, if the detecting unit 451 is detecting a sheet, the state judgment unit 452 controls to delay the feeding to the second sheet ejection sensor 233 temporarily. This will be described more specifically below.

If the signal 518 has a Low state (or if the detecting unit 451 is not detecting a sheet), the state judgment unit 452 transmits an ON signal 550 to the SW 450. On the other hand, if the signal 518 has a High state (or if the detecting unit 451 is detecting a sheet), the state judgment unit 452 transmits an OFF signal to the SW 450.

If the detecting unit 451 shifts from a detecting state to a non-detecting state, the non-detecting state may be kept for a predetermined period of time. This is done for the purpose of preventing an unnecessary shift to a normal power mode since there is a possibility that a return may occur in response to the reaction of the second human sensor 231 immediately after the sheet absent state is detected. Because the other processing is the same as that of the third embodiment, the description will be omitted.

FIG. 15 is a flowchart illustrating an example of a sensor power supply control in the image processing apparatus 100 according to the fourth embodiment. Differences from the third embodiment (FIG. 12) will be described below. The image processing apparatus 100 performs processing in steps S12 to S15 if the normal power mode is not shifted to the power-saving mode (No in S11), that is, in the normal power mode. Because the same processing is performed in steps S12 to S15 as that in the steps in FIG. 12, the description will be omitted.

If the normal power mode is shifted to the power-saving mode (Yes in S11), that is, in the power-saving mode, the image processing apparatus 100 performs processing in step S16 and subsequent steps. Because the same processing is performed in steps S16 to S21 as that in the steps in FIG. 5, the description will be omitted.

The first sheet ejection sensor 232 performs control on basis of whether the detecting unit 451 has detected a sheet on the internal finisher 103 (sheet present state) or not (sheet absent state). If the first sheet ejection sensor 232 determines that the detecting unit 451 is detecting a sheet on the internal finisher 103 (sheet present state) (Yes in S21), the first sheet ejection sensor 232 outputs the ON signal 550 to start the feeding to the second sheet ejection sensor 233 (S30). The processing then moves to step S40. More specifically, the state judgment unit 452 transmits the ON signal 550 to the SW 450. This turns on the SW 450 and thus starts the feeding to the second sheet ejection sensor 233. Because the same processing is performed in steps S40, S41, S22, and S23 as that in FIG. 12, the description will be omitted.

FIGS. 16A to 16E are sequence diagrams showing examples of power supply states of the image processing apparatus 100 and detection states of the sensors according to the fourth embodiment. FIG. 16A is a sequence diagram where the first sheet ejection sensor 232 does not detect a sheet. In the image processing apparatus 100, the second power supply unit 301 is fed if the first human sensor 230 detects a human. Next, the image processing apparatus 100 does not feed to the second sheet ejection sensor 233 because the first sheet ejection sensor 232 does not detect a sheet. Then, in the image processing apparatus 100, the third power supply unit 302 is fed because the second human sensor 231 detects a human. Thus, the mode is shifted to the normal power mode.

FIG. 16B is a sequence diagram where the first sheet ejection sensor 232 detects a sheet and it is determined that a user is approaching to use the image processing apparatus 100. In the image processing apparatus 100, the second power supply unit 301 is fed if the first human sensor 230 detects a human. Next, the image processing apparatus 100 feeds to the second sheet ejection sensor 233 because the first sheet ejection sensor 232 detects a sheet.

In the image processing apparatus 100, because the second human sensor 231 detects a human but the first sheet ejection sensor 232 detects a sheet, the feeding to the third power supply unit 302 is delayed temporarily (for the fifth period of time). Then, in the image processing apparatus 100, because the second sheet ejection sensor 233 is not detecting a user's hand acquiring a sheet and because the first sheet ejection sensor 232 is detecting a sheet until the feeding to the third power supply unit 302 starts, the third power supply unit 302 is fed and the mode is shifted to the normal power mode.

FIG. 16C is a sequence diagram where the first sheet ejection sensor 232 detects a sheet and it is determined that a user is approaching the image processing apparatus 100 to acquire a printed material. In the image processing apparatus 100, the second power supply unit 301 is fed if the first human sensor 230 detects a human. Next, the image processing apparatus 100 feeds to the second sheet ejection sensor 233 because the first sheet ejection sensor 232 detects a sheet.

Then in the image processing apparatus 100, because the second human sensor 231 detects a human but the first sheet ejection sensor 232 is detecting a sheet, the feeding to the third power supply unit 302 is delayed temporarily (for the fifth period of time). Further, because the second sheet ejection sensor 233 detects a hand acquiring a sheet and the second human sensor 231 no longer detects a human before the feeding to the third power supply unit 302 is started, the image processing apparatus 100 disables the feeding to the third power supply unit 302, and the power-saving mode is kept.

For a predetermined period of time from a detection of a hand by the second sheet ejection sensor 233, the power state at that time may be kept (including the feeding to the second sheet ejection sensor 233). This is done for the purpose of preventing an unnecessary shift to the normal power mode when the second human sensor 231 keeps its detecting state in a case where the second sheet ejection sensor 233 detects a hand and then shifts to a non-detecting state.

FIG. 16D is a sequence diagram where the first sheet ejection sensor 232 detects a sheet, and it is determined that a user is coming to the image processing apparatus 100 to acquire the output sheet and use the image processing apparatus 100. In the image processing apparatus 100, if the first human sensor 230 detects a human, the second power supply unit 301 is fed. Next, the image processing apparatus 100 feeds to the second sheet ejection sensor 233 because the first sheet ejection sensor 232 detects a sheet.

Next, in the image processing apparatus 100, because the second human sensor 231 detects a human but the first sheet ejection sensor 232 is detecting a sheet, the feeding to the third power supply unit 302 is delayed temporarily. Then, in the image processing apparatus 100, because the second sheet ejection sensor 233 detects a hand but the state that the second human sensor 231 is detecting a human is kept for a predetermined period of time (sixth period of time) or longer during the delay, it is determined that the image processing apparatus 100 is to be used. Thus, the third power supply unit 302 is fed, and the mode is shifted to the normal power mode.

FIG. 16E is a sequence diagram where the first sheet ejection sensor 232 keeps its sheet detecting state for a predetermined period of time and the mode is shifted to the power-saving mode and it is determined that a user is approaching the image processing apparatus 100 to use it. In the normal power mode, if the first sheet ejection sensor 232 keeps its sheet detecting state for a predetermined period of time (third period of time) or longer, the image processing apparatus 100 sets the ejection flag to "1". If the condition for a shift to the power-saving mode is satisfied, the image processing apparatus 100 is shifted to the power-saving mode 1. After that, if the first human sensor 230 detects a human, the second power supply unit 301 is fed, and the image processing apparatus 100 is shifted to the power-saving mode 2.

Next, the image processing apparatus 100 feeds to the second sheet ejection sensor 233 because the first sheet ejection sensor 232 detects a sheet. Then, because the ejection flag is "1", the third power supply unit 302 is fed if the second human sensor 231 detects a human.

Thus, the use of the two human sensors and two sheet ejection sensor and the SW 450 for feeding to the second sheet ejection sensor 233 allows prevention of an unnecessary return from the power-saving mode in a power saving manner by more precisely and quickly identifying a purpose intended by a user who is approaching the image processing apparatus 100, and more precisely and quickly detecting a human who is coming there to acquire a sheet ejected to the internal sheet ejecting unit, for example. This may reduce unnecessary power consumption and extend the life of a limited life component.

The configuration of the image processing apparatus 100 according to this embodiment is not limited to the configuration as illustrated in FIG. 14A and FIG. 14B but may only be required to implement power supply control as illustrated in FIG. 15 and FIGS. 16A to 16E.

According to the embodiments of the present invention, a purpose intended by an approaching user such as acquiring a sheet ejected in an internal sheet ejecting unit may be determined to prevent an unnecessary return from a power-saving mode and improve user's convenience. Therefore, unnecessary power consumption may be reduced. Moreover, because unnecessary power supply to components that are not fed in a power-saving mode may be prevented. The life of a limited life component may be extended. For example, if the first sheet ejection sensor 232 is detecting a sheet ejected to the internal finisher 103 (Yes in S21), it is determined that there is a high possibility that an object detected by the second human sensor 231 may be a user who is coming to acquire a sheet. A shift from a power-saving mode to a normal power mode in response to the detection of the object by the second human sensor 231 is performed after a lapse of a predetermined period of time. If the first sheet ejection sensor 232 is not detecting a sheet ejected to the internal finisher 103 (No in S21), it is determined that there is a low possibility that the object detected by the second human sensor 231 may be a user who is coming to acquire a sheet. Then, a shift to the normal power mode is performed before a lapse of the predetermined period of time. This may prevent an unnecessary return from the power-saving mode and extend the life of a limited life component by securely determining a purpose of a user who is approaching the image processing apparatus 100.

It may be configured that the control to be performed by the power-supply control unit 203 and first sheet ejection sensor 232 is implemented by reading and executing a program recorded in a computer readable manner to a storage unit such as a flash memory by processors within the power-supply control unit 203 and first sheet ejection sensor 232 or may be implemented by a hardware configuration including circuits.

It should be noted that the configuration and content of data described above are not limited thereto and may vary in accordance with a given application or purpose. Having described embodiments, the present invention may be embodied by a system, an apparatus, a method, a program, a storage medium, etc, for example. More specifically, the present invention is applicable to a system configured by a plurality of apparatuses or to one apparatus. All of configurations acquired by combining embodiments are included in the present invention.

[Other Embodiments]

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-265256, filed Dec. 4, 2012, which is hereby incorporated by reference herein in its entirety.

What is claimed is:

1. An image processing apparatus being capable of operating in at least a first power state and a second power state which consumes less power than the first power state, the image processing apparatus comprising:
   a human sensor configured to detect a human existing around the image processing apparatus;
   a sheet sensor configured to detect a sheet ejected to a sheet ejecting unit in the image processing apparatus; and
   a hand sensor configured to detect a human's hand that is in process of acquiring a sheet ejected to the sheet ejecting unit, and
   a controller configured to shift the image processing apparatus from the second power state to the first power state,
   wherein, in a case where the human sensor has detected a human and the sheet sensor has not detected a sheet, the controller shifts the image processing apparatus from the second power state to the first power state, and
   wherein, in a case where the human sensor has detected a human, the sheet sensor has detected the sheet ejected to the sheet ejecting unit, and the human sensor has continuously detected a human for a predetermined period, the controller shifts the image processing apparatus from the second power state to the first power state, and
   wherein, in a case where the hand sensor has detected a human's hand before the result of the detection by the human sensor indicates that a human has been continuously detected for the predetermined period, the controller refrains from shifting the image processing apparatus from the second power state to the first power state, even when a subsequent result of the detection by the human sensor indicates that a human has been continuously detected for the predetermined period.

2. The image processing apparatus according to claim 1, wherein, in a case where the sheet sensor no longer detects a sheet before the result of the detection by the human sensor indicates that a human has been continuously detected for the predetermined period, the controller refrains from shifting the image processing apparatus from the second power state to the first power state, even if a subsequent result of the detection by the human sensor indicates that a human has been continuously detected for the predetermined period.

3. The image processing apparatus according to claim 1, wherein, in a case where the sheet sensor no longer detects a sheet before the result of the detection by the human sensor indicates that a human has been continuously detected for the predetermined period, the controller shifts the image processing apparatus from the second power state to the first power state based on a human having been continuously detected for a certain period from a time when the sheet sensor no longer detects a sheet.

4. The image processing apparatus according to claim 3, wherein the certain period is longer than the predetermined period.

5. The image processing apparatus according to claim 1, wherein the human sensor is a second human sensor, the image processing apparatus further comprising a first human sensor having a broader detection range than a detection range of the second human sensor,
   wherein the controller shifts the second human sensor to a state in which the second human sensor is capable of detecting a human, based on a result of the detection by the first human sensor.

6. The image processing apparatus according to claim 5, wherein the controller controls the second human sensor, to which a power supply has been stopped, to be supplied with power, based on the result of the detection by the first human sensor.

7. The image processing apparatus according to claim 1, further comprising the sheet ejecting unit,
   wherein the sheet ejecting unit is an internal sheet ejecting unit.

8. A control method for an image processing apparatus being capable of operating in at least a first power state and a second power state which consumes less power than the first power state, the control method comprising:
   presenting the image processing apparatus as including a human sensor configured to detect a human existing around the image processing apparatus, a sheet sensor configured to detect a sheet ejected to a sheet ejecting unit in the image processing apparatus, a hand sensor configured to detect a human's hand that is in process of acquiring a sheet ejected to the sheet ejecting unit, and a controller configured to shift the image processing apparatus from the second power state to the first power state;
   in a case where the human sensor has detected a human and the sheet sensor has not detected a sheet, shifting, via the controller, the image processing apparatus from the second power state to the first power state, and
   in a case where the human sensor has detected a human, the sheet sensor has detected the sheet ejected to the sheet ejecting unit, and the human sensor has continuously detected a human for a predetermined period, shifting, via the controller, the image processing apparatus from the second power state to the first power state, and
   in a case where the hand sensor has detected a human's hand before the result of the detection by the human sensor indicates that a human has been continuously detected for the predetermined period, refraining, via the controller, from shifting the image processing apparatus from the second power state to the first power state, even when a subsequent result of the detection by the human sensor indicates that a human has been continuously detected for the predetermined period.

9. The control method according to claim 8, wherein, in a case where the sheet sensor no longer detects a sheet before the result of the detection by the human sensor indicates that a human has been continuously detected for the predetermined period, refraining includes refraining, via the controller, from shifting the image processing apparatus from the second power state to the first power state, even if a subsequent result of the detection by the human sensor indicates that a human has been continuously detected for the predetermined period.

10. The control method according to claim 8, wherein, in a case where the sheet sensor no longer detects a sheet before the result of the detection by the human sensor indicates that a human has been continuously detected for the predetermined period, shifting includes shifting, via the controller, the image processing apparatus from the second power state to the first power state based on a human having been continuously detected for a certain period from a time when the sheet sensor no longer detects a sheet.

11. The control method according to claim 10, wherein the certain period is longer than the predetermined period.

12. The control method according to claim 8, wherein the human sensor is a second human sensor and presenting further includes presenting a first human sensor having a broader detection range than a detection range of the second human sensor,
  wherein shifting includes shifting, via the controller, the second human sensor to a state in which the second human sensor is capable of detecting a human, based on a result of the detection by the first human sensor.

13. The control method according to claim 12, wherein shifting includes controlling, via the controller, the second human sensor, to which a power supply has been stopped, to be supplied with power, based on the result of the detection by the first human sensor.

14. The control method according to claim 8, wherein presenting further includes presenting the sheet ejecting unit, and wherein the sheet ejecting unit is an internal sheet ejecting unit.

* * * * *